United States Patent
Fish, III

(10) Patent No.: US 9,934,196 B2
(45) Date of Patent: Apr. 3, 2018

(54) THREAD OPTIMIZED MULTIPROCESSOR ARCHITECTURE

(71) Applicant: Russell H. Fish, III, Dallas, TX (US)

(72) Inventor: Russell H. Fish, III, Dallas, TX (US)

(*) Notice: Subject to any disclaimer, the term of this patent is extended or adjusted under 35 U.S.C. 154(b) by 566 days.

(21) Appl. No.: 14/553,262

(22) Filed: Nov. 25, 2014

(65) Prior Publication Data

US 2015/0234777 A1 Aug. 20, 2015

Related U.S. Application Data

(63) Continuation of application No. 12/147,332, filed on Jun. 26, 2008, now Pat. No. 8,984,256, which is a continuation-in-part of application No. 11/702,979, filed on Feb. 5, 2007, now Pat. No. 8,977,836.

(60) Provisional application No. 60/764,955, filed on Feb. 3, 2006.

(51) Int. Cl.
*G06F 15/80* (2006.01)
*G06F 13/28* (2006.01)

(52) U.S. Cl.
CPC .............. *G06F 15/80* (2013.01); *G06F 13/28* (2013.01)

(58) Field of Classification Search
CPC ................................. G06F 15/80; G06F 13/28
See application file for complete search history.

(56) References Cited

U.S. PATENT DOCUMENTS

| | | |
|---|---|---|
| 5,440,749 A | 8/1995 | Moore et al. |
| 5,530,890 A | 6/1996 | Moore et al. |
| 5,604,915 A | 2/1997 | Moore et al. |
| 5,659,703 A | 8/1997 | Moore et al. |
| 5,784,584 A | 7/1998 | Moore et al. |
| 5,809,336 A | 9/1998 | Moore et al. |
| 6,598,148 B1 | 7/2003 | Moore et al. |
| 7,917,788 B2 * | 3/2011 | May ................. G06F 1/3203 323/371 |
| 8,977,836 B2 * | 3/2015 | Fish, III ............ G06F 9/30138 712/14 |
| 8,984,256 B2 * | 3/2015 | Fish .................. G06F 9/30032 712/14 |

OTHER PUBLICATIONS

DIMM_PC_Technical_Manual, Rev. 1.4, by Tri_M Systems, Copyright 1997 USA JUMPtec Industrielle Computertechnik GmbH. p. 9 attached as dimmpcman_rev_14_pdf.
DIMM_PC_Module, Specification, Document Revision 2.1, Copyright 2003 USA Kontron Embedded Computers AG, Section 3.1 DIMM CPU Module Pinout p.5, Sections 4.2.5 and 4.3.1 attached as DIMM_PC_D121_rev_21_pdf.

* cited by examiner

*Primary Examiner* — Seahvosh Nikmanesh
(74) *Attorney, Agent, or Firm* — Carl F. Melito

(57) ABSTRACT

In one aspect, the invention comprises a thread optimized multiprocessor prepared by a semiconductor manufacturing process, comprising the steps of: (a) interconnecting less than 4 layers of metal on at least one die; (b) embedding at least one processor in said at least one die; and (c) mounting said at least one die on a dual inline memory module.

3 Claims, 37 Drawing Sheets

Registers and Data Paths

Instruction Op Code Map

| Op Code | Mnemonic | Operation | Carry |
|---|---|---|---|
| 00b bbbbb | LOADI, IMM | IMM -> ACC | No Change |
| 010 bbbbb | LOADACC, R | R -> ACC | No Change |
| 011 bbbbb | STOREACC, R | ACC -> R | No Change |
| 100 bbbbb | ADD, R | ACC + R -> R | C = carry |
| 101 bbbbb | AND, R | ACC AND R -> R | If Zero, C=1 |
| 110 bbbbb | XOR, R | ACC XOR R -> R | If Zero, C=1 |
| 111 bbbbb | INC, R | R + 1 -> R | If Zero, C=1 | b - a Single Binary Bit
IMM - 6-bit Immediate Operand
R - Register

FIG. 2

Forward Branches

```
          MSB                                    LSB
PC        xxxxxxxx     xxxxxxxx     xxwwwwww
ACC       00000000     00000000     00zzzzzz
```

Forward Branch is Taken, zzzzzz → wwwwww
if wwwwww > zzzzzz,
then xxxxxxxx xxxxxxxx xx + 1 →  xxxxxxxx xxxxxx xx

FIG. 2A

Instruction Map

| Op code bits 4 3 2 1 0 | 765 (000) LOADI | 765 (001) LOADI | 765 (010) LOADACC | 765 (011) STOREACC | 765 (100) ADD | 765 (101) AND | 765 (110) XOR | 765 (111) INC |
|---|---|---|---|---|---|---|---|---|
| 00000 | | | SAVELOOP | if C=0, ACC -> PC | if C=0, ACC+PC->PC | LOOP_IF | NOOP | if C=0, PC+1->PC |
| 00001 | | | SHIFTLOADBYTE | ACC -> PC | ACC+PC->PC | LOOP | SETMSB | PC+1->PC |
| 00010 | | | NOTACC | ROTATELEFT8 | ACC+ACC->ACC modifyC | testACC modifyC | XOR ACC modifyC | INC ACC modifyC |
| 00011 | | | | | | | | |
| 00100 | | | GETNEXT-PROCESSOR | SELECTNEXT-PROCESSOR | START-PROCESSOR | TESTDONE | TEST-AVAILABLE | SET-AVAILABLE |
| 00101 | | | S->ACC | ACC->(S) | ACC+(S)->ACC | NOOP | NOOP | NOOP |
| 00110 | | | S->ACC | ACC->(S) | (S)+ACC->ACC | (S)&ACC->ACC | (S)^ACC->ACC | (S)|ACC->ACC |
| 00111 | | | POP | NOOP | NOOP | NOOP | NOOP | NOOP |
| 01000 | | | RIGHTSHIFTACC | PUSH | (S)+ACC->ACC S+ | (S)&ACC->ACC S+ | (S)^ACC->ACC S+ | (S)|ACC->ACC S+ |
| 01001 | | | | | | | | |
| 01010 | | | X->ACC | ACC->X | ACC+X->X | NOOP | NOOP | NOOP |
| 01011 | | | Operate on X_cache Register Pointed to by X ||||||
| 01100 | | | Pre-decrement X, Operate on X_cache Register Pointed to by X ||||||
| 01101 | | | Operate on X_cache Register Pointed to by X, Post-increment X ||||||
| 01110 | Short Immediate Operands || Y->ACC | ACC->Y | ACC+Y->Y | NOOP | NOOP | NOOP |
| 01111 | | | Operate on Y_cache Register Pointed to by Y ||||||
| 10000 | | | Pre-decrement Y, Operate on Y_cache Register Pointed to by Y ||||||
| 10001 | | | Operate on Y_cache Register Pointed to by Y, Post-increment Y ||||||
| 10010 | | | Shared Variable ||||||
| 10011 | | | General Purpose Registers ||||||
| 10100 | | | ||||||
| 10101 | | | ||||||
| 10110 | | | ||||||
| 10111 | | | ||||||
| 11000 | | | ||||||
| 11001 | | | ||||||
| 11010 | | | ||||||
| 11011 | | | ||||||
| 11100 | | | ||||||
| 11101 | | | ||||||
| 11110 | | | ||||||
| 11111 | | | ||||||

FIG. 2B

Multiprocessor Management Instruction Set Extensions

| Mnemonic | Operation | Carry Effect |
|---|---|---|
| GETNEXTPROCESSOR | N -> ACC | No Change |
| SELECTPROCESSOR | ACC -> PSR | No Change |
| STARTPROCESSOR | ACC -> Processor[PC] | On Success, C=1 |
| TESTDONE | TEST Processor PC]=-1 | If PC=-1, Set C=1 |
| TESTAVAILABLE | TEST Processor[AvailableFlag] | If Available, Set C=1 |
| SETAVAILABLE | Set AvailableFlag to 1 | No Change |
| READSHAREDVARIABLE | Processor[SharedVariable]->ACC | No Change |
| STORESHAREDVARIABLE | ACC -> SharedVariable | No Change |

Note: Op Codes are Implementation Dependent and are Selected from the Available op Codes Indicated in FIG. 2B b - a Single Binary Bit
IMM - 6-bit Immediate Operand
R - Register
N - 32-bit Integer
PSR - Processor Select Register
Processor - Processor Indicated by Processor Select Register

FIG. 2C

Instruction Set Extensions

| Mnemonic | Operation | Carry Effect |
|---|---|---|
| SAVELOOP | PC -> -(S) | No Change |
| SHIFTLOADBYTE | Shift ACC left 8 bits, next byte -> ACC | No Change |
| LOOP | (S) -> PC | No Change |
| LOOP_IF | if C=0, (S) -> PC | No Change |
| NOTACC | ~ACC -> ACC | If ACC=0, Set C=1 |
| ROTATELEFT8 | Rotate ACC 8 bits left | No Change |
| ORSTACK | ACC\| (S) -> ACC | If ACC=0, Set C=1 |
| ORSTACK+ | ACC\| (S)+ -> ACC | If ACC=0, Set C=1 |
| RIGHTSHIFTACC | Shift ACC right | LSB -> C |
| SETMSB | 2^31 -> ACC | No Change |

Note: Op codes are implementation dependent and are selected from the available op codes indicated in FIG. 2B b - a single binary bit
IMM - 6-bit immediate operand
R - Register
N - 32-bit integer
PSR - Processor Select Register
Processor - Processor indicated by Processor Select Register

FIG. 2E

Effective Addresses

| Register | Name | Effective Operand | Cycles | Special Operations |
|---|---|---|---|---|
| 00000 | PC0 | PC+3 for read, else PC | 1 | Write is Conditional on C=0 |
| 00001 | PC1 | load 8-bit imm. read, else PC | 1 | |
| 00010 | ACC | ACC | 1 | |
| 00011 | | | | |
| 00100 | S | S | 1 | |
| 00101 | (S) | data addressed by S | 2 | |
| 00110 | -(S) | (S) predecrement | 2 | |
| 00111 | (S)+ | (S) postincrement | 2 | |
| 01000 | X | X | 1 | |
| 01001 | (X) | data addressed by X | 2 | |
| 01010 | -(X) | (X) predecrement | 2 | |
| 01011 | (X)+ | (X) postincrement | 2 | |
| 01100 | Y | Y | 1 | |
| 01101 | (Y) | data addressed by Y | 2 | |
| 01110 | -(Y) | (Y) predecrement | 2 | |
| 01111 | (Y)+ | (Y) postincrement | 2 | |
| 10000 | R10 | Register 10 | 1 | |
| 10001 | R11 | Register 11 | 1 | |
| 10010 | R12 | Register 12 | 1 | |
| 10011 | R13 | Register 13 | 1 | |
| 10100 | R14 | Register 14 | 1 | |
| 10101 | R15 | Register 15 | 1 | |
| 10110 | R16 | Register 16 | 1 | |
| 10110 | R17 | Register 17 | 1 | |
| 10111 | R18 | Register 18 | 1 | |
| 11000 | R19 | Register 19 | 1 | |
| 11001 | R1A | Register 1A | 1 | |
| 11010 | R1B | Register 1B | 1 | |
| 11011 | R1C | Register 1C | 1 | |
| 11100 | R1D | Register 1D | 1 | |
| 11101 | R1E | Register 1E | 1 | |
| 11111 | R1F | Register 1F | 1 | |

FIG. 3

System Memory Map

System RAM — Always Addresses System Memory (Accessible to All Processors)

Processor Availability Table

| Processor | Available_flag | Done_flag | Interrupt Vector | Time_started | Error_flag |
|---|---|---|---|---|---|
| 3F | | | | | |
| 3E | | | | | |
| 3D | | | | | |
| 3C | | | | | |
| 3B | | | | | |
| 3A | | | | | |
| 30 | | | | | |
| 2F | | | | | |
| 2E | | | | | |
| ⋮ | | | ↕ | | |
| 08 | | | | | |
| 07 | | | | | |
| 06 | | | | | |
| 05 | | | | | |
| 04 | | | | | |
| 03 | | | | | |
| 02 | | | | | |
| 01 | | | | | |

FIG. 9

TOMI Processors Mounted on a DIMM

Single TOMI package — Sixty four 32-bit TOMI CPUs + 64Mbyte RAM (assuming a 64Mbyte DRAM)

Sixteen TOMI packages on a DIMM
(Eight on each side of the DIMM)

1024 32-bit TOMI CPUs + 1Gbyte RAM

A TOMI System with a General Purpose CPU

TOMI Processor Initialization

1. TOMI CPUs are Enabled by the Memory Mode Register

2. Reset Configuration is:
- All Processors Stopped but Master Processor,
- Master Processor Clock Set to Slow Speed,
- Master Processor PC Set to 0,
- Master Processor Instruction Cache Loaded with Address 0 Which Contains Power-on-self-test (POST) and Starting Execution Address 3. Master Processor Performs Power-on-self-test 4. Master Processor Determines its Optimal Clock Speed 5. Master Processor:
- Starts Each Slave Processor Individually,
- Tests at Slow Speed,
- Stops the Processor 6. Master Processor:
- Starts Each Slave Processor Individually,
- Determines the Optimal Clock Speed for Each Slave Processor,
- Stops the Processor 7. Master Processor Begins Executing at the Starting Execution Address

FIG. 10C

Single TOMI Processor Side View With 2
Layers of Metal and Interconnect

Single TOMI Processor Side View With 15
Layers of Metal and Interconnect

Factoring Computation Memory Map

| Address | Contents |
|---|---|
| X(25) | Processor 25 Capture RAM |
| Y(25) | Processor 25 Result RAM |
| X(24) | Processor 24 Capture RAM |
| Y(24) | Processor 24 Result RAM |
| X(23) | Processor 23 Capture RAM |
| Y(23) | Processor 23 Result RAM |
| X(22) | Processor 22 Capture RAM |
| Y(22) | Processor 22 Result RAM |
| X(21) | Processor 21 Capture RAM |
| Y(21) | Processor 21 Result RAM |
| X(20) | Processor 20 Capture RAM |
| Y(20) | Processor 20 Result RAM |
| ⋮ | ↕ |
| X(1) | Processor 1 Capture RAM |
| Y(1) | Processor 1 Result RAM |

FIG. 12

Possible Floorplan of 64 Processor System

| Signal Name | Direction | From/To | Description |
|---|---|---|---|
| RSTB | In | global | Reset Bar Input |
| CLK | In | global | System Clock Input |
| M[8191:0] | I/O | memory | Wide memory data bus (8K bits) |
| MADD[31:10] | Out | memory | High order memory bits addressing 8K bit sets of memory per address |
| STARTREADREQUEST | Out | memory | Request read data from DRAM bank |
| STRATWRITEREQUEST | Out | memory | Request write data to DRAM bank |
| WRITECOMPLETE | In | memory | Feedback from memory controller that operation is complete |
| READCOMPLETE | In | memory | Feedback from memory controller that operation is complete |
| To be determined: | | | |
| WP | Out | arbiter | Write Processor Indexed by Processor Select Register |
| RPSR | Out | arbiter | Read Processor Select Register |
| PSR[5:0] | I/O | PSR | Processor Select Data Bus |
| Signal Names | From Block | To Block | |
| ENOR | INSTRUCTION_DECODER | ALU | Enable OR function between A and B inputs, result at S |
| ENPB | INSTRUCTION_DECODER | ALU | Enable pass B function from B to S |
| ENAND | INSTRUCTION_DECODER | ALU | Enable AND function between A and B inputs, result at S |
| ENXOR | INSTRUCTION_DECODER | ALU | Enable XOR function between A and B inputs, result at S |
| CI | INSTRUCTION_DECODER | ALU | ALU Carry in input used for addition, increment, decrement instructions |
| CE | INSTRUCTION_DECODER | ALU | Carry enable turns on carry lookahead adder unit for addition inc, dec. |
| CO | ALU | | Overflow result or Carry Out from ALU for operations using Carry |

FIG. 15E-1

| Signal Name | Direction | From/To | Description |
|---|---|---|---|
| A[31:0] | ACCUMULATOR | ALU | Accumulator Value used as one ALU input |
| B[31:0] | REGISTERS or CACHE | ALU | Register and Cache value used as the second ALU input |
| S[31:0] | ALU | Multiple locations | ALU Output Sum or Result |
| EM | INSTRUCTION_DECODER | Optional Multiplier | Enable Multiplier Output |
| CARRY | OVERFCARRY | INSTRUCTION_DECODER | Indicates if a carry occurred after the last test "TST" instruction |
| TST | INSTRUCTION_DECODER | OVERFCARRY | Latches the carry result to a register for use by a later branch instruction |
| AEQB | COMPARE | INSTRUCTION_DECODE | Instruction decode input indicating comparison result between A and B |
| WX | INSTRUCTION_DECODER | CACHE | Write X Register |
| WY | INSTRUCTION_DECODER | CACHE | Write Y Register |
| WS | INSTRUCTION_DECODER | CACHE | Write Stack |
| RX | INSTRUCTION_DECODER | CACHE | Read X Register |
| RY | INSTRUCTION_DECODER | CACHE | Read Y Register |
| ENI | INSTRUCTION_DECODER | CACHE | Enable Index |
| ENA | INSTRUCTION_DECODER | TRISTATE32 | Allows the Accumulator to drive both ALU inputs all the same time |
| TIELOW TO WI | UNUSED | CACHE | This signal would allow instruction cache to write back to memory. Not useful |
| PC[31:0] | REGISTERS | CACHE | Program Counter |
| INDEX[9:2] | REGISTERS | CACHE | Index Value of 32 bit set within 8Kbits |
| XMISS | REGISTERS | CACHE | Indicates a X Cache miss and will generate a Read or Write Memory request |
| YMISS | REGISTERS | CACHE | Indicates a Y Cache miss and will generate a Read or Write Memory request |

FIG. 15E-2

| Signal Name | Direction | From/To | Description |
|---|---|---|---|
| SMISS | REGISTERS | CACHE | Indicates a Stack Cache miss and will generate a Read or Write Memory request |
| PCMISS | REGISTERS | CACHE | Indicates a Program Counter Cache miss and will generate a Read Memory request |
| INCPC | CACHE | REGISTERS | Used to prevent PC from counting while waiting for a cache miss to resolve |
| INCP_SKIP | INSTRUCTION_DECODER | REGISTERS | Used to increment PC twice in order to skip an instruction |
| L[21:0] | INSTRUCTION_DECODER | REGISTERS | Load control lines for all registers. |
| ENPC | REGISTERS | CACHE | Enable Program Counter Output |
| F0 | REGISTERS | CACHE | Force 0000 hex. Can be used with F1 to force 8000 hex. |
| F1 | REGISTERS | CACHE | Force 0001 hex. Can be used with F0 to force 8000 hex. |
| ENX | REGISTERS | CACHE | Enable X Register Out |
| INCX | REGISTERS | CACHE | Increment X |
| DECX | REGISTERS | CACHE | Decrement X |
| ENY | REGISTERS | CACHE | Enable Y Register Out |
| INCY | REGISTERS | CACHE | Increment Y |
| DECY | REGISTERS | CACHE | Decrement Y |
| ENS | REGISTERS | CACHE | Enable Stack Pointer |
| INCS | REGISTERS | CACHE | Increment Stack Pointer |
| DECS | REGISTERS | CACHE | Decrement Stack Pointer |
| LR | INSTRUCTION_DECODER | REGISTER_DECODE | Load Data Register |
| INSTRUCTION[7:0] | CACHE | INSTRUCTION_DECODE | Eight Bit TOMI Instruction |

FIG. 15E-3

THREAD OPTIMIZED MULTIPROCESSOR ARCHITECTURE

CROSS REFERENCE TO RELATED APPLICATIONS

This application is a continuation of U.S. patent application Ser. No. 12/147,332 (now U.S. Pat. No. 8,984,256) and claims priority to U.S. patent application Ser. No. 12/147,332, filed Jun. 26, 2008, U.S. patent application Ser. No. 11/702,979 (now U.S. Pat. No. 8,977,836) filed Feb. 5, 2007, and U.S. Provisional Patent Application No. 60/764,955, filed Feb. 3, 2006. The entire contents of U.S. patent application Ser. No. 12/147,332, U.S. patent application Ser. No. 11/702,979, and U.S. Provisional Patent Application No. 60/764,955 are incorporated herein by reference.

BACKGROUND AND SUMMARY

Computer speed may be increased using two general approaches: increase instruction execution speed or do more instruction execution in parallel. As instruction execution speed approaches the limits of electron mobility in silicon, parallelism becomes the best alternative to increasing computer speed.

Previous attempts at parallelism have included:

1. Overlapping next instruction fetching with current instruction execution.

2. Instruction pipelining. An instruction pipeline breaks each instruction into as many pieces as possible and then attempts to map sequential instructions into parallel execution units. Theoretical maximum improvement is seldom achieved due to the inefficiencies of multi-step instructions, inability of many software programs to provide enough sequential instructions to keep the parallel execution units filled, and the large time penalty paid when a branch, loop, or case construct is encountered requiring the refilling of the execution units.

3. Single instruction multiple data or SIMD. This type of technique is found in the Intel SSE instruction set, as implemented in the Intel Pentium 3 and other processors. In this technique, a single instruction executes on multiple data sets. This technique is useful only for special applications such as video graphics rendering.

4. Hypercube. This technique employs large two-dimensional arrays and sometimes three-dimensional arrays of processors and local memory. The communications and interconnects necessary to support these arrays of processors inherently limits them to very specialized applications.

A pipeline is an instruction execution unit consisting of multiple sequential stages that successively perform a piece of an instruction's execution, such as fetch, decode, execute, store, etc. Several pipelines may be placed in parallel, such that program instructions are fed to each pipeline one after another until all pipelines are executing an instruction. Then the instruction filling repeats with the original pipeline. When N pipelines are filled with instructions and executing, the performance effect is theoretically the same as an N times increase in execution speed for a single execution unit.

Successful pipelining depends upon the following:

1. An instruction's execution must be able to be defined as several successive states.

2. Each instruction must have the same number of states.

3. The number of states per instruction determines the maximum number of parallel execution units.

Since pipelining can achieve performance increases based on the number of parallel pipelines, and since the number of parallel pipelines is determined by the number of states in an instruction, pipelines encourage complex multi-state instructions.

Heavily pipelined computers very seldom achieve performance anywhere near the theoretical performance improvement expected from the parallel pipeline execution units.

Several reasons for this pipeline penalty include:

1. Software programs are not made up of only sequential instructions. Various studies indicate changes of execution flow occur every 8-10 instructions. Any branch that changes program flow upsets the pipeline. Attempts to minimize the pipeline upset tend to be complex and incomplete in their mitigation.

2. Forcing all instructions to have the same number of states often leads to execution pipelines that satisfy the requirements of the lowest common denominator (i.e., the slowest and most complex) instructions. Because of the pipeline, all instructions are forced into the same number of states, regardless of whether they need them or not. For example, logic operations (such as AND or OR) execute an order of magnitude faster than an ADD, but often both are allocated the same amount of time for execution.

3. Pipelines encourage multi-state complex instructions. Instructions that might require two states are typically stretched to fill 20 states because that is the depth of the pipeline. (The Intel Pentium 4 uses a 20 state pipeline.)

4. The time required for each pipeline state must account for propagation delays through the logic circuitry and associated transistors, in addition to the design margins or tolerances for the particular state.

5. Arbitration for pipeline register and other resource access often reduces performance due to the propagation delays of the transistors in the arbitration logic.

6. There is an upper limit on the number of states into which an instruction may be split before the additional state actually slows down execution, rather than speeds it up. Some studies have suggested that the pipeline architecture in the last generation of Digital Equipment Corporation's Alpha processor exceeded that point and actually performed slower that the previous, shorter pipelined version of the processor.

Splitting Apart the Pipelines

One perspective to re-factoring CPU design is to think of pipelined execution units that are then split into multiple (N) simplified processors. (Registers and some other logic may need to be duplicated in such a design.) Each of the N simplified processors would have the following advantages over the above-discussed pipelined architectures:

1. No pipeline stalls. No branch prediction necessity.

2. Instructions could take as much or as little time as they need, rather than all being allocated the same execution time as the slowest instruction.

3. Instructions could be simplified by reducing the necessary execution states, thereby reducing the pipeline penalty.

4. Each state eliminated from the pipeline could eliminate propagation delays and remove design margins necessary for the state.

5. Register arbitration could be eliminated.

Furthermore, a system with N simplified processors could have the following advantages over a pipelined CPU:

1. The limit of maximum pipeline parallelism would be eliminated.

2. Unlike a pipelined processor, multiple standalone processors could be selectively powered down to reduce power consumption when not in use.

Other Problems with Current Approaches to Parallelism

Many implementations of parallelism succumb to the limits of Amdahl's Law.

Acceleration through parallelism is limited by overhead due to non-serializable portions of the problem. In essence, as the amount of parallelism increases, the communications necessary to support it overwhelms the gains due to the parallelism.

Stoplight Sitting at Redline

Another inefficiency of current processors is the inability of scaling the computing power to meet the immediate computing demand. Most computers spend most of their time waiting for something to happen. They wait for I/O, for the next instruction, for memory access, or sometimes human interface. This waiting is an inefficient waste of computing power. Furthermore, the computer time spent waiting often results in increased power consumption and heat generation.

The exceptions to the waiting rule are applications like engine controllers, signal processors, and firewall routers. These applications are excellent candidates for parallelism acceleration due to the predefined nature of the problem sets and solution sets. A problem that requires the product of N independent multiplications may be solved faster using N multipliers.

The perceived performance of a general purpose computer is really its peak performance. The closest a general purpose computer gets to being busy is running a video game with a rapid screen refresh, compiling a large source file, or searching a database. In an optimal world, the video rendering would be factored into special purpose, shading, transforming, and rendering hardware. One method of factoring the programming to such special purpose hardware is the use of "threads."

Threads are independent programs that are self contained and infrequently communicate data with other threads. A common use of threads is to collect data from slow realtime activity and provide the assembled results. A thread might also be used to render a change on a display. A thread may transition through thousands or millions of states before requiring further interaction with another thread. Independent threads present an opportunity for increased performance through parallelism.

Many software compilers support the generation and management of threads for the purposes of factoring the software design process. The same factoring will support multiple CPU parallel processing via the technique of Thread Level Parallelism implemented in a Thread Optimized Microprocessor (TOMI) of the preferred embodiment.

Thread Level Parallelism

Threading is a well understood technique for factoring software programs on a single CPU. Thread level parallelism can achieve program acceleration through use of a TOMI processor.

One significant advantage of a TOMI processor over other parallel approaches is that a TOMI processor requires minimal changes to current software programming techniques. New algorithms do not need to be developed. Many existing programs may need to be recompiled, but not substantially rewritten.

An efficient TOMI computer architecture should be built around a large number of simplified processors. Different architectures may be used for different types of computing problems.

Fundamental Computer Operations

For a general purpose computer, the most common operations in order of declining frequency are: Loads and stores; Sequencing; and Math and logic.

Load and Store

The parameters of LOAD and STORE are the source and destination. The power of the LOAD and STORE is the range of source and destination (for example, 4 Gbytes is a more powerful range than 256 bytes). Locality relative to the current source and destination is important for many data sets. Plus 1, minus 1 are the most useful.

Increasing offsets from the current source and destination are progressively less useful.

LOAD and STORE may also be affected by the memory hierarchy. A LOAD from storage may be the slowest operation a CPU can perform.

Sequencing

Branches and loops are the fundamental sequencing instructions. Instruction sequence changes based on a test is the way computers make decisions.

Math and Logic

Math and logic operations are the least used of the three operations. Logic operations are the fastest operations a CPU can perform and can require as little as a single logic gate delay. Math operations are more complex since higher order bits depend on the results of lower order bit operations. A 32-bit ADD can require at least 32 gate delays, even with carry lookahead. MULTIPLY using a shift and add technique can require the equivalent of 32 ADDs.

Tradeoffs of Instruction Size

The perfect instruction set would consist of op-codes that are large enough to select infinite possible sources, destinations, operations, and next instructions. Unfortunately the perfect instruction set op-codes would be infinitely wide and the instruction bandwidth would therefore be zero.

Computer design for high-instruction bandwidth involves the creation of an instruction set with op-codes able to efficiently define the most common sources, destinations, operations, and next instructions with the fewest op-code bits.

Wide op-codes lead to high instruction bus bandwidth requirements and the resulting architecture will be quickly limited by the Von Neuman bottleneck, wherein the computer's performance is limited by the speed with which it fetches instructions from memory.

If a memory bus is 64 bits wide, one could fetch a single 64-bit instruction, two 32-bit instructions, four 16-bit instructions, or eight 8-bit instructions in each memory cycle. A 32-bit instruction had better be twice as useful as a 16-bit instruction, since it cuts the instruction bandwidth in half.

A major objective of instruction set design is to reduce instruction redundancy. In general an optimized efficient instruction set takes advantage of the locality of both instructions and data. The easiest instruction optimizations have long since been done. For most computer programs, the most likely next instruction is the sequentially next instruction in memory. Therefore instead of every instruction having a next instruction field, most instructions assume the next instruction is the current instruction +1. It is possible to create an architecture with zero bits for source and zero bits for destination.

Stack Architectures

Stack architecture computers are also called zero operand architectures. A stack architecture performs all operations based on the contents of a push down stack. A two operand operation would require both operands be present on the stack. When the operation executes, both operands would be POP'd from the stack, the operation would be performed, and the result would be PUSH'd back on the stack. Stack architecture computers can have very short op-codes since the source and destination are implied as being on the stack.

Most programs require the contents of global registers that may not always be available on the stack when needed. Attempts to minimize this occurrence have included stack indexing that allows accessing operands other than those on the top of the stack. Stack indexing requires either additional op-code bits resulting in larger instructions or additional operations to place the stack index value on the stack itself. Sometimes one or more additional stacks are defined. A better but not optimal solution is a combination stack/register architecture.

Stack architecture operation is also often redundant in ways that defy obvious optimizations. For example, each POP and PUSH operation has the potential to cause a time wasting memory operation as the stack is manipulated in memory. Furthermore, the stack operation may consume an operand that may be immediately needed for the next operation, thereby requiring operand duplication with the potential of yet another memory operation. Take for example, the operation of multiplying all the elements of a one dimensional array by 15.

On a stack architecture, this is implemented by:
 1. PUSH start address of array
 2. DUPLICATE address (So we have the address to store the result to the array.)
 3. DUPLICATE address (So we have the address to read from the array.)
 4. PUSH INDIRECT (PUSH the contents of the array location pointed to by the top of stack)
 5. PUSH 15
 6. MULTIPLY (15 times the array contents we read in line 3)
 7. SWAP (Get the array address on the top of the stack for the next instruction.)
 8. POP INDIRECT (POPs the multiplication result and stores it back to the array.)
 9. INCREMENT (Point to the next array item.)
 10. Go to step 2 until the array is done.

The loop counter in line 9 would require an additional parameter. In some architectures, this parameter is stored on another stack.

On a hypothetical register/accumulator architecture, the example is implemented by:
 1. STORE POINTER start address of array
 2. READ POINTER (Read the contents of the address pointed to into an accumulator.)
 3. MULTIPLY 15
 4. STORE POINTER (Store the result into the address pointed to.)
 5. INCREMENT POINTER
 6. Go to line 2 until the array is done.

Compare the nine steps for the stack architecture versus the five steps for the register architecture for the above example. Furthermore, the stack operation has at least 3 possible opportunities for an extra memory access due to stack operation. The loop control of the hypothetical register/accumulator architecture could easily be handled in a register.

Stacks are useful for evaluating expressions and are used as such in most compilers. Stacks are also useful for nested operations such as function calls. Most C compilers implement function calls with a stack. However, without supplementing by general purpose storage, a stack architecture requires lots of extra data movement and manipulation. For optimization purposes, stack PUSH and POP operations should also be separated from math and logic operations. But as can be seen from the example above, stacks are particularly inefficient when loading and storing data repeatedly, since the array addresses are consumed by the PUSH INDIRECT and POP INDIRECT.

In one aspect, the invention comprises a system comprising: (a) a plurality of parallel processors on a single chip; and (b) computer memory located on the chip and accessible by each of the processors; wherein each of the processors is operable to process a de minimis instruction set, and wherein each of the processors comprises local caches dedicated to each of at least three specific registers in the processor.

In various embodiments: (1) the size of each of the local caches is equivalent to one row of random access memory on the chip; (2) the at least three specific registers with an associated cache include an instruction register, source register, and destination register; (3) the de minimis instruction set comprises seven basic instructions; (4) each of the processors is operable to process a single thread; (5) an accumulator is an operand for every instruction, except an increment instruction; (6) a destination for each basic instruction is always an operand register; (7) three registers auto-increment and three registers auto-decrement; (8) the instruction set comprises no BRANCH instruction and no JUMP instruction; (9) each instruction is at most 8 bits in length; and (10) a single master processor is responsible for managing each of the parallel processors.

In another aspect, the invention comprises a system comprising: (a) a plurality of parallel processors on a single chip; and (b) computer memory located on the chip and accessible by each of the processors, wherein each of the processors is operable to process an instruction set optimized for thread-level parallel processing.

In various embodiments: (1) each of the processors is operable to process a de minimis instruction set; (2) each of the processors comprises local caches dedicated to each of at least three specific registers in the processor; (3) the size of each of the local caches is equivalent to one row of random access memory on the chip; (4) the at least three specific registers include an instruction register, source register, and destination register; (5) the de minimis instruction set comprises seven basic instructions; (6) each of the processors is operable to process a single thread; (7) a single master processor is responsible for managing each of the parallel processors; and (8) the de minimis instruction set includes a minimal set of instruction extensions to optimize processor operation and facilitate software compiler efficiency.

In another embodiment, the invention comprises a method of thread-level parallel processing utilizing a plurality of parallel processors, a master processor, and a computer memory on a single chip, wherein each of the plurality of processors is operable to process a de minimis instruction set and to process a single thread, comprising: (a) allocating local caches to each of three specific registers in each of the plurality of processors; (b) allocating one of the plurality of processors to process a single thread; (c) processing each allocated thread by the processors; (d) processing the results from each thread processed by the processors; (e) de-allocating one of the plurality of processors after a thread has been processed; and (f) the de minimis instruction set includes a minimal set of instructions to optimize processor management.

In various embodiments the de minimis instruction set comprises seven basic instructions and the instructions in the de minimis instruction set are at most 8 bits in length. The de minimis instruction set may also include a set of extension instructions, beyond the seven basic instructions, that optimize the internal operation of the TOMI CPU and help optimize the execution of software program instructions being executed by a TOMI CPU and optimize the operation of software compilers for the TOMI CPU.

Embodiments of the invention with multiple TOMI CPU cores may also include a limited set of processor management instructions used for managing the multiple CPU cores.

In another aspect, the invention comprises a system comprising: (a) a plurality of parallel processors mounted on a memory module; (b) an external memory controller; and (c) a general purpose central processing unit; wherein each of the parallel processors is operable to process an instruction set optimized for thread-level parallel processing.

In various embodiments: (1) each of the parallel processors is operable to process a de minimis instruction set; (2) one or more bits allocated in a memory mode register is operable to enable or disable one or more of the parallel processors; (3) the memory module is a dual inline memory module; (4) each of the processors is operable to process a single thread; (5) a plurality of threads share data through shared memory; (6) a plurality of threads share data through one or more shared variables; (7) the memory module is one or more of: DRAM, SRAM, and FLASH memory; (8) at least one of the parallel processors is treated as a master processor and other of the parallel processors are treated as slave processors; (9) each processor has a clock speed, and each processor other than the master processor is operable to have the processor's clock speed adjusted to optimize either performance or power consumption; (10) each processor is operable to be treated as either a master processor or a slave processor; (11) the master processor requests processing by several slave processors, waits for output from the several slave processors, and combines the output; (12) the master processor combines output from the several processors as the output is received from each of the several processors; (13) low power dissipation is provided by enabling one or more of the parallel processors to be stopped; and (14) each of the parallel processors is associated with a program counter and is operable to be stopped by writing all ones (1's) to a program counter associated with the parallel processor.

In another aspect, the invention comprises a system comprising a plurality of parallel processors embedded into a dynamic random access memory (DRAM) die, the plurality of parallel processors in communication with an external memory controller and an external processor, and wherein each of the parallel processors is operable to process an instruction set optimized for thread-level parallel processing.

In various other embodiments: (1) the die is packaged with a DRAM pinout; (2) the parallel processors are mounted on a dual inline memory module; (3) the system operates as DRAM except when the processors are enabled through a DRAM mode register; (4) the external processor is operable to transfer data and instructions from an associated permanent storage device to the DRAM; (5) the permanent storage device is FLASH memory; and (6) the external processor is operable to provide an input/output interface between the parallel processors and external devices.

In another aspect, the invention comprises a system comprising: (a) a plurality of processors on a single chip; and (b) computer memory located on the chip and accessible by each of the processors, wherein each of the processors is operable to process a de minimis instruction set, and wherein each of the processors comprises local caches dedicated to each of at least three specific registers in the processor.

In various other embodiments: (1) the size of each of the local caches is equivalent to one row of random access memory on the chip; (2) each processor accesses an internal data bus of random access memory on the chip and the internal data bus has a width of one row of the random access memory; (3) the width of the internal data bus is 1024, 2048, 4096, 8192, 16328, or 32656 bits; (4) the width of the internal data bus is an integer multiple of 1024 bits; (5) the local caches dedicated to each of at least three specific registers in the processor are operable to be filled or flushed in one memory read or write cycle; (6) the de minimis instruction set consists essentially of seven basic instructions; (7) the basic instruction set includes ADD, XOR, INC, AND, STOREACC, LOADACC, and LOADI instructions; (8) each instruction in the de minimis instruction set is at most 8 bits in length; (9) the de minimis instruction set comprises a plurality of instruction extensions to optimize execution of instruction sequences on a processor, further wherein such instruction extensions consists essentially of less than 20 instructions; (10) each instruction extension is at most 8 bits in length; (11) the de minimis instruction set comprises a set of instructions to selectively control the plurality of processors on the chip; (12) each processor control instruction is at most 8 bits in length; (13) the plurality of processors are manufactured on the chip with the computer memory located on the chip using a semiconductor manufacturing process designed for monolithic memory devices; (14) the semiconductor manufacturing process uses less than 4 layers of metal interconnect; (15) the semiconductor manufacturing process uses less than 3 layers of metal interconnect; (16) integration of the plurality of processors into the computer memory circuit results in less than 30% increase in chip die size; (17) integration of the plurality of processors into the computer memory circuit results in less than 20% increase in chip die size; (18) integration of the plurality of processors into the computer memory circuit results in less than 10% increase in chip die size; (19) integration of the plurality of processors into the computer memory circuit results in less than 5% increase in chip die size; (20) less than 250,000 transistors are used to create each processor on the chip; (21) the chip is manufactured using a semiconductor manufacturing process using less than 4 layers of metal interconnect; (22) each of the processors is operable to process a single thread; (23) an accumulator is an operand for every basic instruction, except an increment instruction; (24) a destination for each basic instruction is always an operand register; (25) three registers auto-increment and three registers auto-decrement; (26) each basic instruction requires only one clock cycle to complete; (27) the instruction set comprises no BRANCH instruction and no JUMP instruction; and (28) a single master processor is responsible for managing each of the parallel processors.

In another aspect, the invention comprises a system comprising: (a) a plurality of parallel processors on a single chip; and (b) computer memory located on the chip and accessible by each of the processors, wherein each of the processors is operable to process an instruction set optimized for thread-level parallel processing; and wherein each processor accesses the internal data bus of the computer memory on the chip, and the internal data bus is no wider than one row of the memory.

In various embodiments: (1) each of the processors is operable to process a de minimis instruction set; (2) each of the processors comprises local caches dedicated to each of at least three specific registers in the processor; (3) the size of each of the local caches is equivalent to one row of computer memory on the chip; (4) the at least three specific registers include an instruction register, source register, and destination register; (5) the de minimis instruction set consists essentially of seven basic instructions; (6) the basic instruction set includes ADD, XOR, INC, AND, STOREACC, LOADACC, and LOADI instructions; (7) each instruction in the instruction set is at most 8 bits in length; (8) each of the processors is operable to process a single thread; (9) a single master processor is responsible for managing each of the parallel processors; (10) the de minimis instruction set comprises a plurality of instruction extensions to optimize execution of instruction sequences on a processor, further wherein such instruction extensions comprise less than 20 instructions; (11) each instruction extension is at most 8 bits in length; (12) the de minimis instruction set comprises a set of instructions to selectively control the plurality of processors on the chip; (13) each processor control instruction is at most 8 bits in length; and (14) the plurality of processors are capable of being manufactured on the chip with the computer memory located on the chip using a semiconductor manufacturing process designed for monolithic memory devices.

In another aspect, the invention comprises a method of thread-level parallel processing utilizing a plurality of parallel processors, a master processor, and a computer memory on a single chip, wherein each of the plurality of processors is operable to process a de minimis instruction set and to process a single thread, comprising: (a) allocating local caches to each of three specific registers in each of the plurality of processors; (b) allocating one of the plurality of processors to process a single thread; (c) processing each allocated thread by the processors; (d) processing the results from each thread processed by the processors; and (e) de-allocating one of the plurality of processors after a thread has been processed.

In various embodiments: (1) the de minimis instruction set consists essentially of seven basic instructions; (2) the basic instructions comprise ADD, XOR, INC, AND, STOREACC, LOADACC, and LOADI instructions; (3) the de minimis instruction set comprises a set of instructions to selectively control the plurality of processors; (4) each processor control instruction is at most 8 bits in length; (5) the method further comprises the step of each processor accessing the computer memory using an internal data bus of the memory, wherein the internal data bus is the width of one row of memory on the chip; and (6) each instruction in the de minimis instruction set is at most 8 bits in length.

In another aspect, the invention comprises a system comprising: (a) a plurality of processors embedded in a memory chip that is compatible with electronics industry standard device packaging and pin layout for such memory devices; and (b) one or more of the processors may be activated through information transmitted to a memory mode register of the memory chip, wherein the memory chip is functionally compatible with the operation of industry standard memory devices except when one or more of the processors are activated through the memory mode register.

BRIEF DESCRIPTION OF THE DRAWINGS

FIG. 2 shows an exemplary basic instruction set.
FIG. 2A shows a forward branch in operation.
FIG. 2B illustrates an instruction map for an exemplary TOMI instruction set.
FIG. 2C illustrates an exemplary set of multiple TOMI processor management instruction extensions.
FIG. 2E shows an exemplary set of instruction extensions.
FIG. 3 illustrates effective addresses of different addressing modes.
FIG. 9 depicts an exemplary process availability table.
FIG. 10C depicts an exemplary TOMI processor initialization for an embodiment of multiple TOMI processors.
FIG. 12 depicts exemplary system RAM.
FIGS. 15E-1 through 15E-3 show the signal descriptions for the schematic shown in FIGS. 15A-D.

DETAILED DESCRIPTION OF CERTAIN EMBODIMENTS

The TOMI architecture of at least one embodiment of the present invention preferably uses the minimum logic possible to operate as a general purpose computer. The most common operations are given priority. Most operations are visible, regular, and available for compiler optimization.

Figure 1:
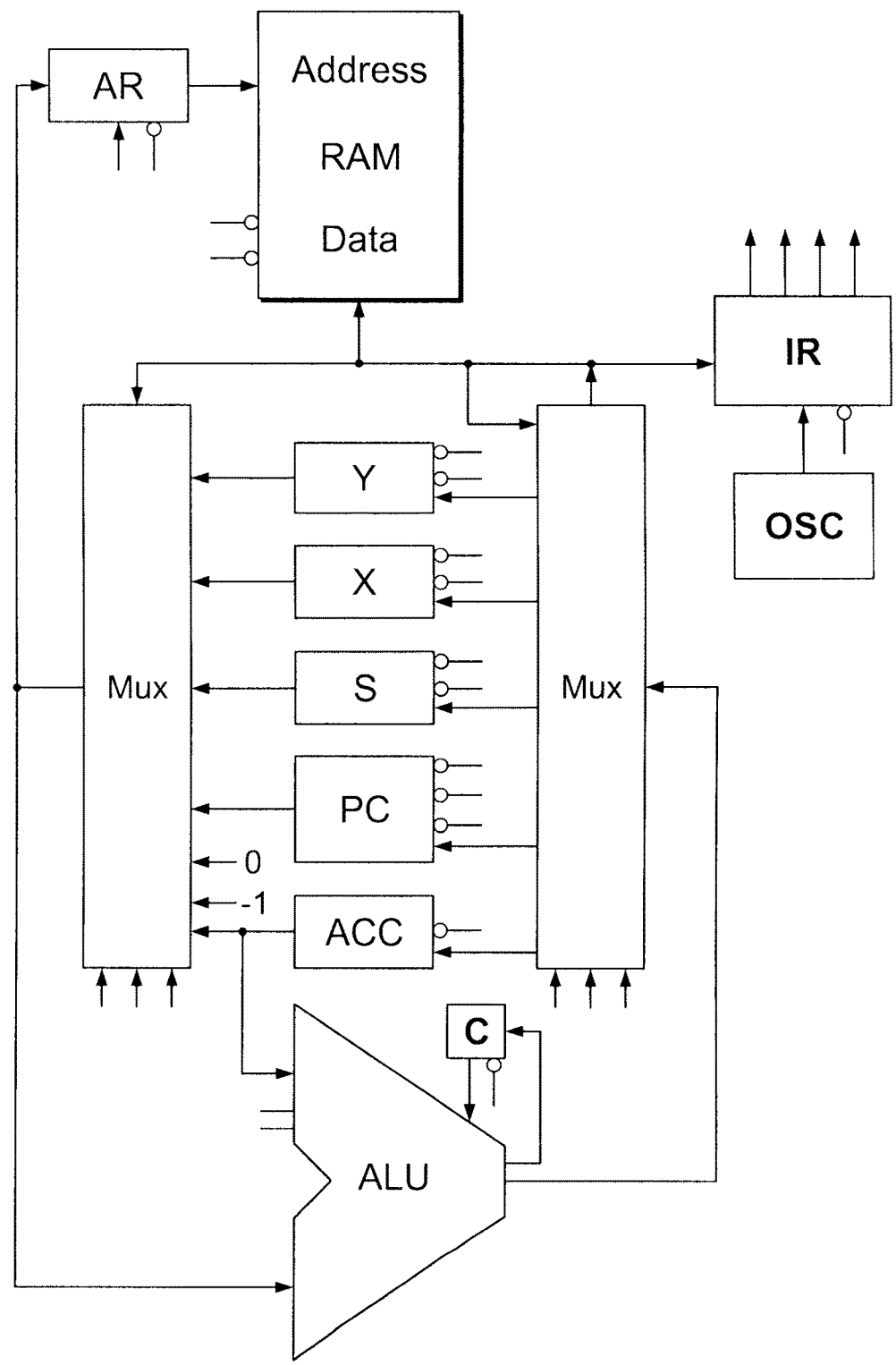
FIG. 1 depicts exemplary TOMI architecture of one embodiment.

In one embodiment, the TOMI architecture is a variation on accumulator, register, and stack architectures, as illustrated in FIG. 1. In this embodiment:

1. Like an accumulator architecture, the accumulator is always one of the operands, except for the increment instruction.

2. Like a register architecture, the destination is always one of the operand registers.

3. The accumulator and program counter are also in the register space and may therefore be operated on.

4. Three special registers auto-increment and auto-decrement and are useful for creating stacks and streams of input and output.

5. All instructions are 8-bits in length, simplifying and speeding instruction decode.

6. There is no BRANCH or JUMP instruction.

Figure 2D:
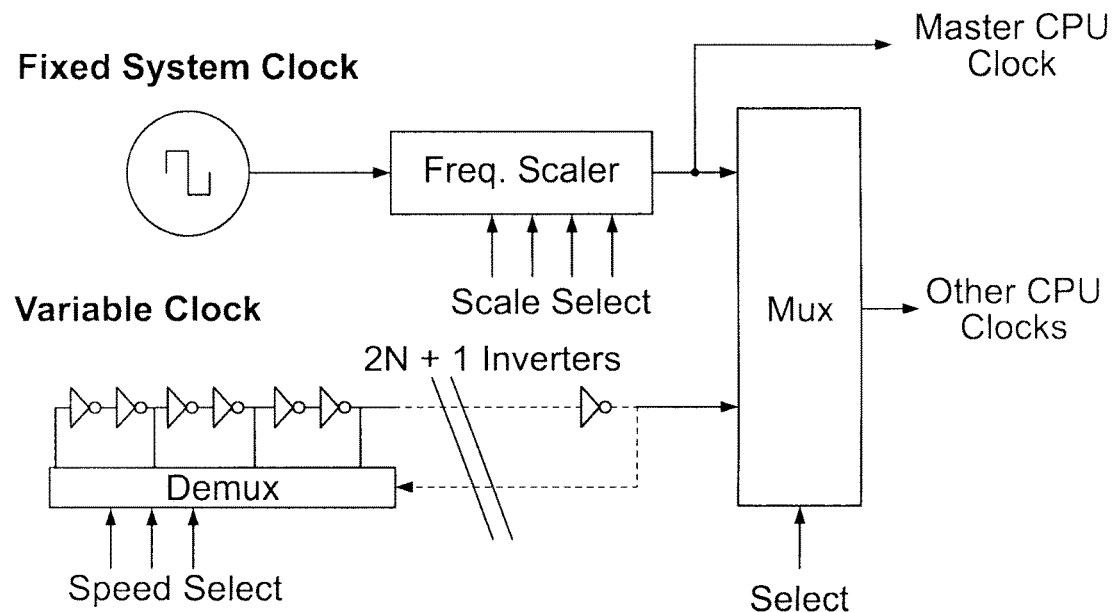
FIG. 2D illustrates a clock programming circuit for a TOMI processor.

7. There are just seven basic instructions enabling 3 bits of operator selection from an 8-bit instruction, as illustrated by FIG. 2.

Some of the benefits of the preferred embodiment include:

1. All operations run at the maximum speed allowed by the logic, rather than being constricted by the equality necessitated by a pipeline. Logic operations are fastest.

Math operations are next fastest. Operations requiring memory access are slowest.

2. The architecture scales to any data width, limited only by package pins, adder carry times, and usefulness.

3. The architecture is near the minimum possible functionality necessary to perform all the operations of a general purpose computer.

4. The architecture is very transparent, very regular, and most operations are available to the optimizing compiler.

The architecture is designed to be simple enough to be replicated numerous times on a single monolithic chip. One embodiment embeds multiple copies of the CPU monolithically with memory. A simplified 32-bit CPU may be implemented in fewer than 1,500 gates, with most of the gates defining the registers. Nearly 1,000 TOMI CPUs of a preferred embodiment can be implemented using the same number of transistors as a single Intel Pentium 4.

The reduced instruction set in the TOMI CPU is factored to execute the operations necessary for a general purpose computer. The smaller the instruction set is for a processor, the more efficiently it will run. The TOMI CPU is designed with an extraordinarily low number of instructions compared to modern processor architectures. For example, one embodiment of the TOMI CPU has 25 instructions, compared to the Intel Pentium processor which has 286 instructions, Intel Itanium Montecito processor with 195 instructions, the StrongARM processor with 127 instructions, and the IBM Cell processor with over 400 instructions.

The basic set of instructions for the TOMI CPU are simplified and designed to execute in a single system clock cycle, as opposed to 30 clock cycles required for the latest generation Pentium processor. The TOMI CPU architecture is a "pipelineless" architecture. This architecture and single clock cycle instruction execution significantly reduce or eliminate stalls, dependencies and wasted clock cycles found in other parallel processing or pipelined architectures. While the basic instructions only require a single clock cycle to execute, as clock speeds increase (and clock cycle times decrease), the time required for the execution result to propagate through the circuit transistor gates for complex mathematical instructions (such as ADD) may reach the limit of a single clock cycle. In such instances, it may be optimal to allow two clock cycles for the execution of the particular instruction, so as not to slow down the execution of the faster instructions. This will depend upon the optimization of the CPU design to the system clock speed, manufacturing process, and circuit layout.

The TOMI simplified instruction set allows a 32-bit TOMI CPU to be built with fewer than 5,000 transistors (not including the caches). A top-level schematic of an embodiment of a single 32-bit TOMI CPU is shown in FIGS. 15A through 15D, with the signal descriptions shown in FIG. 15E. Even with the caches and related decode logic, a 32-bit TOMI CPU can be built using between 40,000 and 200,000 transistors (depending upon the size of the CPU caches), as compared to the 250,000,000 transistors needed for the latest generation Intel Pentium microprocessor chip. Legacy microprocessor architectures (such as the Intel Pentium, Itanium, IBM Cell, and StrongARM, to name a few) have required vast and increasing numbers of transistors to achieve even incremental increases in processing capacity. The TOMI CPU architecture contradicts this industry progression by utilizing an extraordinarily low number of transistors per CPU core. The low transistor count for the TOMI CPU provides numerous advantages.

Due to the compact size of the TOMI CPU, multiple CPUs can be built on the same silicon chip. This also allows multiple CPUs to be built on the same chip as the main memory, such as a DRAM, at little additional manufacturing cost, beyond the manufacturing cost of the DRAM chip itself. Thus, multiple TOMI CPUs can be placed on a single chip for parallel processing with only a minimal increase in die size for the DRAM chip and manufacturing cost. For example, a 512 MB DRAM contains approximately 700 million transistors. 64 TOMI CPUs (assuming 200,000 transistors for a single TOMI CPU) would only add 12.8 million transistors to any DRAM design. For a 512 MB DRAM, 64 TOMI CPUs would increase the die size by less than 5%.

The TOMI CPUs are designed to be manufactured using existing inexpensive commodity memory manufacturing processes, such as for DRAM, SRAM, and FLASH memory devices. The low transistor count for a TOMI CPU means that the CPU can be built in a small area and can easily be interconnected in silicon using an inexpensive semiconductor manufacturing process with 2 layers of metal interconnect, rather than complex and expensive manufacturing processes used to manufacture large microprocessor chips (such as the Intel Pentium) utilizing 8 or more layers of metal interconnect or other logic processes. Modern DRAMs and other commodity memory chips utilize simpler and lower-cost semiconductor manufacturing processes with fewer layers (e.g., 2) of metal interconnect to achieve lower manufacturing costs, higher product volume, and higher product yields. The semiconductor manufacturing process for commodity memory devices is generally characterized by low current leakage device operation; while processes used to build modern microprocessors strive for high speed and high performance characteristics, rather than transistor-level low current leakage values. The ability of the TOMI CPU to be efficiently implemented with the same manufacturing process used for DRAMs and other memory devices allows the TOMI CPU to be embedded within an existing DRAM chip (or other memory chip) and to take advantage of low-cost, high yield memory chip manufacturing processes. This also provides the advantage that TOMI CPUs can be manufactured using the same packaging and device pin layout (conforming, for example, to JEDEC standards for memory devices), fabrication facilities, test fixtures, and test vectors currently in industry use for DRAMs and other memory chips. A preferred embodiment describes embedding CPUs into a legacy DRAM. This contrasts favorably with the alternative of embedding a DRAM into a legacy microprocessor. Due to its high transistor count compared to a preferred embodiment of the present invention, a legacy microprocessor would likely generate much greater levels of electrical noise and heat which can adversely affect the performance and reliability of the embedded DRAM. Furthermore, a DRAM embedded on a legacy microprocessor would likely require a process with 8 or more layers of metal interconnect compared to a preferred embodiment's 2 layers. In comparison, the resulting DRAM embedded into a legacy microprocessor would likely be higher cost, lower yield, higher power consumption, and, ultimately, lower performance.

Another advantage of the preferred embodiment is that the TOMI CPUs are small enough (and require little power) that they can physically reside next to the DRAM (or other memory) circuitry and allow the CPUs access to the ultra-wide internal DRAM data bus. In modern DRAMs, this bus is 1024, 4096, or 8192 bits wide (or an integer multiple thereof), which also typically corresponds to the width of one row of data in the data banks within the DRAM design. (By comparison, the Intel Pentium data bus is 64 bits and the Intel Itanium bus is 128 bits wide.) The internal caches of the TOMI CPU can be sized to match the DRAM row size so that the CPU cache can be filled (or flushed) in a single DRAM memory read or write cycle. The TOMI CPU uses the ultra-wide internal DRAM data bus as the data bus for the TOMI CPU. The TOMI CPU caches may be designed to mirror the design of the DRAM row and/or column latch circuitry for efficient layout and circuit operation, including data transfers to the TOMI CPU caches.

Another advantage of the preferred embodiment is the low level of electrical noise generated by the TOMI CPUs due to the low transistor count, and because the CPU utilizes the ultra-wide internal DRAM data bus to access memory, rather than constantly driving I/O circuitry to access off-chip memory for data. The on-chip CPU caches allow for immediate access to data for processing, thus minimizing the need for off-chip memory accesses.

A design objective of processor architectures is to maximize processing capacity and speed, while minimizing the power required to achieve that processing speed. The TOMI CPU architecture is a high-speed processor, with extremely low power consumption. The power consumption of a processor is directly related to the number of transistors used in the design. The low transistor count for the TOMI CPU minimizes its power consumption. The simplified and efficient instruction set also allows the TOMI CPU to reduce its power consumption. In addition, the TOMI CPU caches and access to on-chip memory using the wide internal DRAM data bus eliminate the need to constantly drive the I/O circuitry for off-chip memory access. A single TOMI CPU operating at 1 GHz clock speed will consume approximately 20 to 25 milliwatts of power. In contrast, the Intel Pentium 4 processor requires 130 watts at 2.93 GHz, Intel Itanium processor requires 52 watts at 1.6 GHz, StrongARM processor requires 1 watt at 200 MHz, and the IBM Cell processor requires 100 watts at 3.2 GHz. It is well known that heat generation in a processor is directly related to the amount of power required by a processor. The extremely low power TOMI CPU architecture eliminates the need for fans, large heat sinks, and exotic cooling mechanisms found in current microprocessor architectures. At the same time, the low-power TOMI CPU architecture makes new low-power battery and solar powered applications feasible.

Instruction Set

The seven basic instructions in an exemplary instruction set are shown in FIG. 2 along with their bit mappings. Each instruction preferably consists of a single 8-bit word.

Addressing Modes

FIG. 3 illustrates the effective addresses of the different addressing modes.

The addressing modes are:
Immediate
Register
Register Indirect
Register Indirect Auto-increment
Register Indirect Auto-decrement Special Cases Register 0 and Register 1 both refer to the Program Counter (PC). In one embodiment, all operations with Register 0 (the PC) as the operand are conditional on the accumulator carry bit (C) equal to 1. If C=1, the old value of PC is swapped into the accumulator (ACC). All operations with Register 1 (the PC) as the operand are unconditional.

In an alternative embodiment, write operations with Register 0 (PC) as the destination are conditional on the carry bit (C) equal to 0. If C=1, no operation is performed. If C=0, the value in the accumulator (ACC) is written to the PC, and program control changes to the new PC address. Write operations with Register 1 (PC) as the destination are unconditional. The value in the accumulator (ACC) is written to the PC, and program control changes to the new PC address.

Read operations, with Register 0 as the source, load the value of the PC+3. In this way, the address of the top of a loop may be read and stored for later use. In most cases, the loop address will be pushed on the stack (S). Read operations with Register 1 as the source load the value pointed to by the next full word addressed by the PC. In this way, a 32-bit immediate operand may be loaded. The 32-bit immediate operand must be word aligned, but the LOADACC instruction may be at any byte position in the 4-byte word immediately preceding the 32-bit immediate operand. Following execution of the read, the PC will be incremented such that it addresses the first word aligned instruction following the 32-bit immediate operand.

There is No Branch

Branch and Jump operations are usually a problem for CPU designers because they require many bits of precious op-code space. The branching function may be created by loading the desired branch address into the ACC using LOADACC, xx and then using the STOREACC, PC instruction to effect the branch. A branch may be made conditional on the state of C by storing to Register 0.

Skip

A skip may be created by executing INC, PC. Execution will require two cycles, one for the current PC increment cycle to complete and one for the INC. A skip may be made conditional on the state of C by incrementing Register 0.

A Relative Branch

A relative branch may be created by loading the desired offset into the ACC and then executing the ADD, PC instruction. A relative branch may be made conditional on the state of C by adding to Register 0.

Forward Branches

Forward branches are more useful than rearward branches since the location of the rearward branches necessary for loops is easily captured by saving the PC as the program steps through the top of the loop the first time.

A more efficient forward branch than the relative branch may be created by loading the least significant bits of the branch endpoint into the ACC and then storing to the PC. Since the PC can be accessed both conditionally or unconditionally depending upon the use of Register 0 or Register 1, the forward branch may also be conditional or unconditional by the selection of the PC register (Register 0 or Register 1) as the destination operand.

For example:
LOADI, #1C
STOREACC, PC

If the most significant bits of the ACC are zero, only the least significant 6 bits are transferred to the PC register. The most significant bits of the register remain unchanged if the least significant 6 bits of the current PC register are smaller than the ACC value to be loaded. If the least significant 6 bits of the current PC register are greater than the ACC value to be loaded, the current PC register is incremented, starting with the 7th bit.

This effectively allows branches of up to 31 instructions forward. This method of forward branching should be used whenever possible because not only does it require 2 instructions versus 3 instructions for the relative branch, but it does not require a pass through the adder, which is one of the slowest operations. FIG. 2A shows the forward branch in operation.

Loops

The top of a loop may be saved using LOADACC, PC. The resulting pointer to the top of the looping construct may then be stored in a register or pushed into one of the autoindexing registers. At the bottom of the loop, the pointer may be retrieved with LOADACC, EA and restored to the PC using STOREACC, PC, thereby causing a backwards loop. The loop may be made conditional on the state of C by storing to Register 0 thereby causing a conditional backwards loop.

Self Modifying Code

It is possible to write self-modifying code using STOREACC, PC. An instruction may be created or fetched into the ACC and then stored into the PC where it will execute as the next instruction. This technique may be used to create a CASE construct.

Assume a jump table array in memory consisting of N addresses and base address of JUMPTABLE. For convenience, JUMPTABLE might be in low memory so its address can be created with LOADI or a LOADI following by one or more right shifts, ADD, ACC.

Assume that the index into the jump table is in ACC and the base address of the jump table is in a general purpose register named JUMPTABLE: TABLE-US-00001 ADD, JUMPTABLE Add the index to the base address of the jump table. LOADACC, (JUMPTABLE) Load the indexed address STOREACC, PC Execute the jump.

If low order memory starting at 0000 is allocated to system calls, each system call may be executed as follows where SPECIAL_FUNCTION is the name of an immediate operand 0-63: TABLE-US-00002 LOADI, SPECIAL_FUNCTION Load the system call number LOADACC, (ACC) Load the address of the system call STOREACC, PC Jump to the function.

Right Shift

The basic architecture does not envision a right shift operation. Should such an operation be required, the solution of a preferred embodiment is to designate one of the general purpose registers as the "right shift register." A STOREACC, RIGHTSHIFT would store the ACC right shifted a single position into the "right shift register" where its value could be read with LOADACC, RIGHTSHIFT.

Architectural Scalability

Figure 4:
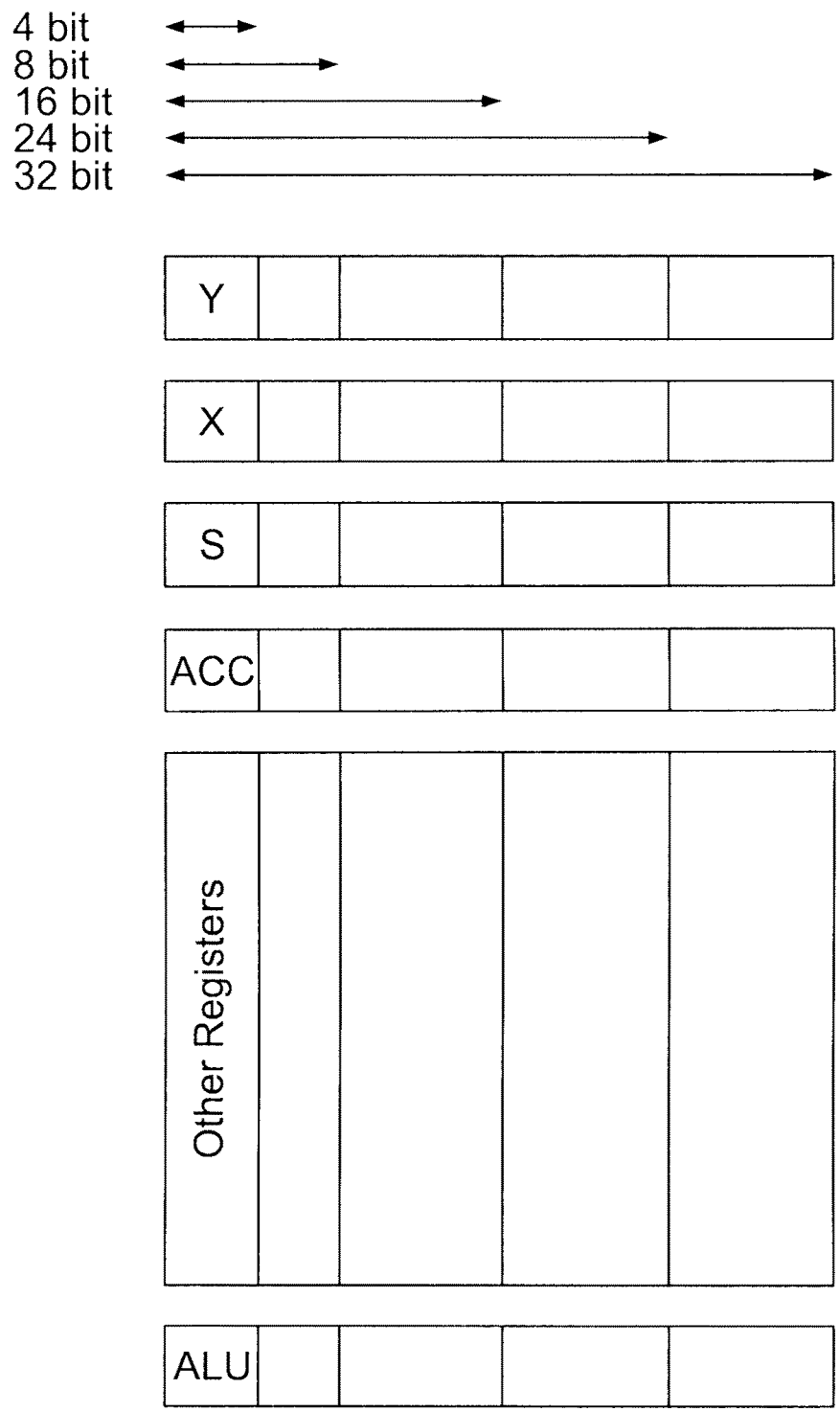
FIG. 4 illustrates how data paths from 4-32 bits are easily created.

The TOMI architecture preferably features 8-bit instructions, but the data width need not be restricted. FIG. 4 illustrates how any width data paths from 4-32 bits are easily created. Creating larger width data handling only requires increasing the width of the register set, the internal data paths, and the ALU to the desired widths. The upper bound of the data path is only limited by the carry propagation delay of the adder and the transistor budget.

The preferred TOMI architecture is implemented as a Von Neumann memory configuration for simplicity, but a Harvard architecture implementation (with separate data and instruction buses) is also possible.

Common Math Operations

Two's complement math can be done several ways. A general purpose register may be preconfigured as all "1s" and named ALLONES. The operand will be assumed to be in a register named OPERAND: TABLE-US-00003 LOADACC, ALLONES XOR, OPERAND INC, OPERAND The "2s" complement is left in OPERAND.

Common Compiler Constructions

Most computer programs are generated by a compiler. Therefore, a useful computer architecture should be adept at common compiler constructions.

A C compiler will normally maintain a stack for passing parameters to function calls. The S, X, or Y registers may be used as the stack pointer. The function call will push the parameters onto one of the autoindexing registers acting as the stack, using, for example: STOREACC, (X)+. Upon entering the function the parameters will be POP'd into general purpose registers for use.

Stack Relative Addressing

There will be times when there are more elements passed in the function call than can conveniently fit in the general purpose registers. For the purposes of the following example it is assumed that a stack push operation decrements the stack. If S is being used as the stack register, to read the Nth item relative to the top of the stack:

LOADI, N
STOREACC, X
LOADACC, S
ADD, X
LOADACC, (X)

Indexing into an Array

Upon entry into the array function, the base address of the array is located in a general purpose register named ARRAY. To read the Nth element in the array:

LOADI, N
STOREACC, X
LOADACC, ARRAY
ADD, X
LOADACC, (X)

Indexing into an N Word Element Array

Sometimes an array will be allocated for elements N words wide. The base address of the array is located in a general purpose register named ARRAY. To access the first word of the Nth element in a 5 word wide array: TABLE-US-00004 LOADI, N STOREACC, X Store in temporary register ADD, ACC Multiply by 2 ADD, ACC By 2 again=4 ADD, X plus 1=5 LOADACC, ARRAY ADD, X plus the base address of the array LOADACC, (X)

Instruction Set Extensions

Another embodiment of the invention includes extensions of the seven basic instructions shown in FIG. 2. The instruction set extensions shown in FIG. 2E help further optimize the internal operation of the TOMI processor, software program instructions, and software compilers for the TOMI processor.

SAVELOOP—This instruction pushes the current value of the program counter onto the stack. Saveloop will most likely be executed at the top of a looping construct. At the bottom of the loop, the saved program counter value will be copied from the stack and stored to the program counter, effecting a backward jump to the top of the loop.

SHIFTLOADBYTE—This instruction shifts the ACC left 8 bits, reads the 8-bit byte following the instruction, and places it into the least significant 8-bits of ACC. In this manner, long immediate operands may be loaded with a sequence of instructions. For example to load a 14-bit immediate operand:

| | |
|---|---|
| LOADI, #14 | \\ Load the 6 most significant bits of the 14 bit operand. |
| SHIFTLOADBYTE | \\ Shift the 6 bits 8 positions to the left and load the following 8-bit value. |
| CONSTANT #E8 | \\ Eight bit immediate operand. |

The resulting hex value in ACC will be 14E8.

LOOP—This instruction copies the top of the stack to the program counter. Loop will most likely be executed at the bottom of a looping construct following execution of Saveloop to store the program counter at the top of the loop. When Loop executes, the saved program counter will be copied from the stack and stored to the program counter, effecting a backward jump to the top of the loop.

LOOP_IF—This instruction copies the top of the stack to the program counter. It performs a conditional loop, based on the value of C. Loop_if will most likely be executed at the bottom of a looping construct following execution of Saveloop to store the program counter at the top of the loop. When Loop_if executes, if C=0, the saved program counter will be copied from the stack and stored to the program counter, effecting a backward jump to the top of the loop. If C=1, the program counter will increment to point to the next sequential instruction.

NOTACC—Complement each bit of ACC. If ACC=0, set C to 1. Otherwise, set C to 0.

ROTATELEFT8—Rotate the ACC 8 bits left. At each rotate step, the MSB shifted out of ACC is shifted into the LSB of ACC.

ORSTACK—Perform a logical OR on ACC and the value in the top of stack. Place the result in ACC. If ACC=0, set C to 1. Otherwise, set C to 0.

ORSTACK+—Perform a logical OR on ACC and the value in the top of stack. Place the result in ACC. After the logical operation, increment the stack pointer, S. If ACC=0, set C to 1. Otherwise, set C to 0.

RIGHTSHIFTACC—Shift ACC right by a single bit. The LSB of ACC is shifted into C.

SETMSB—Set the most significant bit of ACC. There is no change to C. This instruction is used in performing signed comparison.

Local TOMI Caching

A cache is memory smaller in size and faster in access than the main memory. The reduced access time and the locality of program and data accesses allow cache operations to increase performance of a preferred TOMI processor for many operations. From another perspective, a cache increases parallel processing performance by increasing independence of a TOMI processor from main memory. The relative performance of cache to main memory and the number of cycles the TOMI processor can execute before requiring another main memory load or store to or from cache determine the amount of performance increase due to TOMI processor parallelism.

Figure 5:
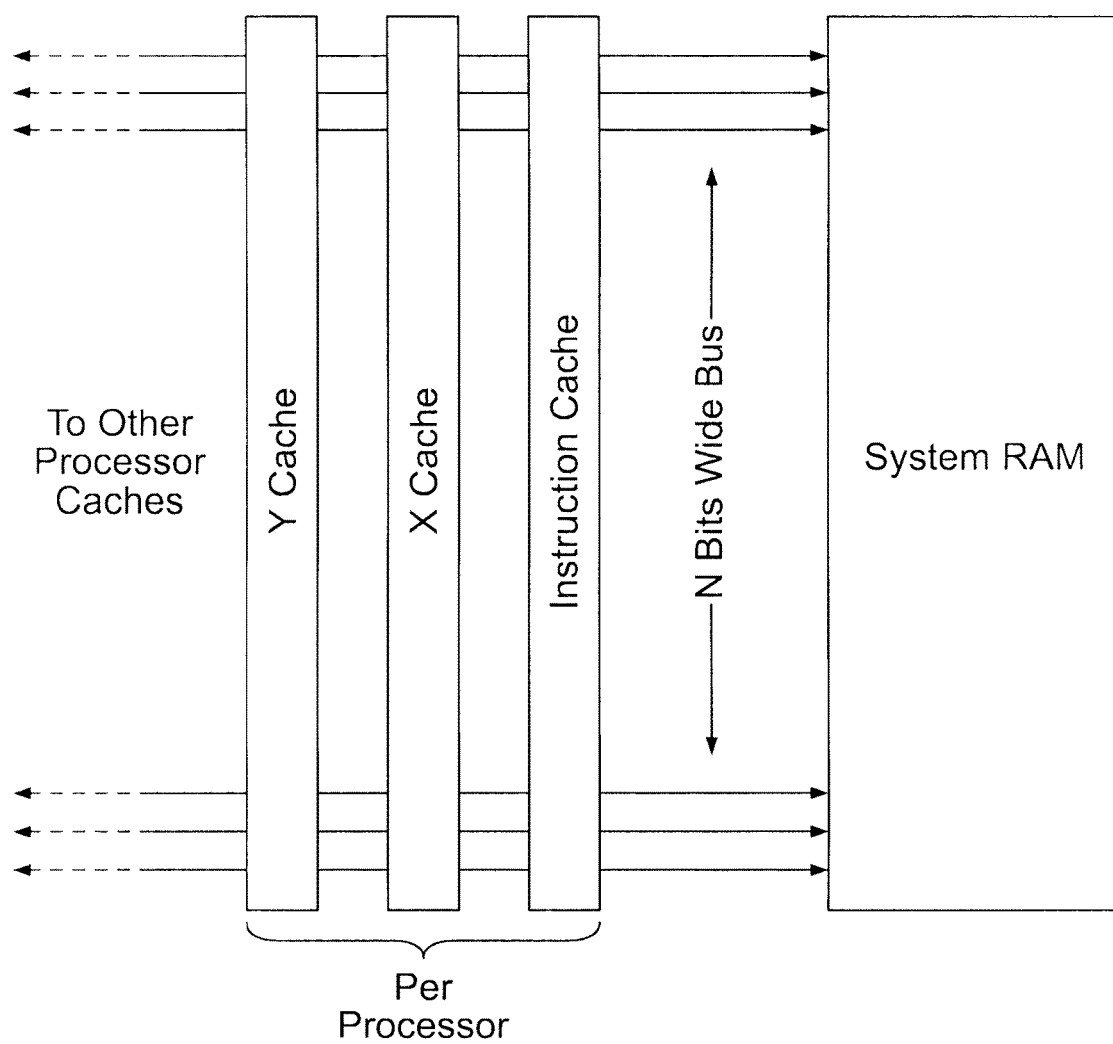
FIG. 5 depicts exemplary local caches.

TOMI local caches enhance the performance increase due to TOMI processor parallelism. Each TOMI processor preferably has three associated local caches, as illustrated in FIG. 5:

Instruction—associated with the PC
Source—associated with the X register
Destination—associated with the Y register Since the caches are associated with specific registers, rather than "data" or "instruction" fetches, the cache control logic is simplified and cache latency is significantly reduced. The optimal dimensions of these caches are application dependent. A typical embodiment may require 1024 bytes for each cache. In other words, 1024 instructions, and 256 32-bit words of source and destination. At least two factors determine the optimum size of the caches. First is the number of states the TOMI processor can cycle before another cache load or store operation is required. Second is the cost of the cache load or store operation from main memory relative to the number of TOMI processor execution cycles possible during the main memory operation.

Embedding TOMI Processors in RAM

In one embodiment, a wide bus connects the large embedded memory to the caches, so a load or store operation to the caches can occur quickly. With TOMI processors embedded in RAM, a load or store of an entire cache would consist of a single memory cycle to a RAM column. In one embodiment, the embedded memory will be responding to requests of 63 TOMI processors, so the response time of a cache load or store for one TOMI processor may be extended while the load or store of another TOMI processor cache completes.

Figure 6:
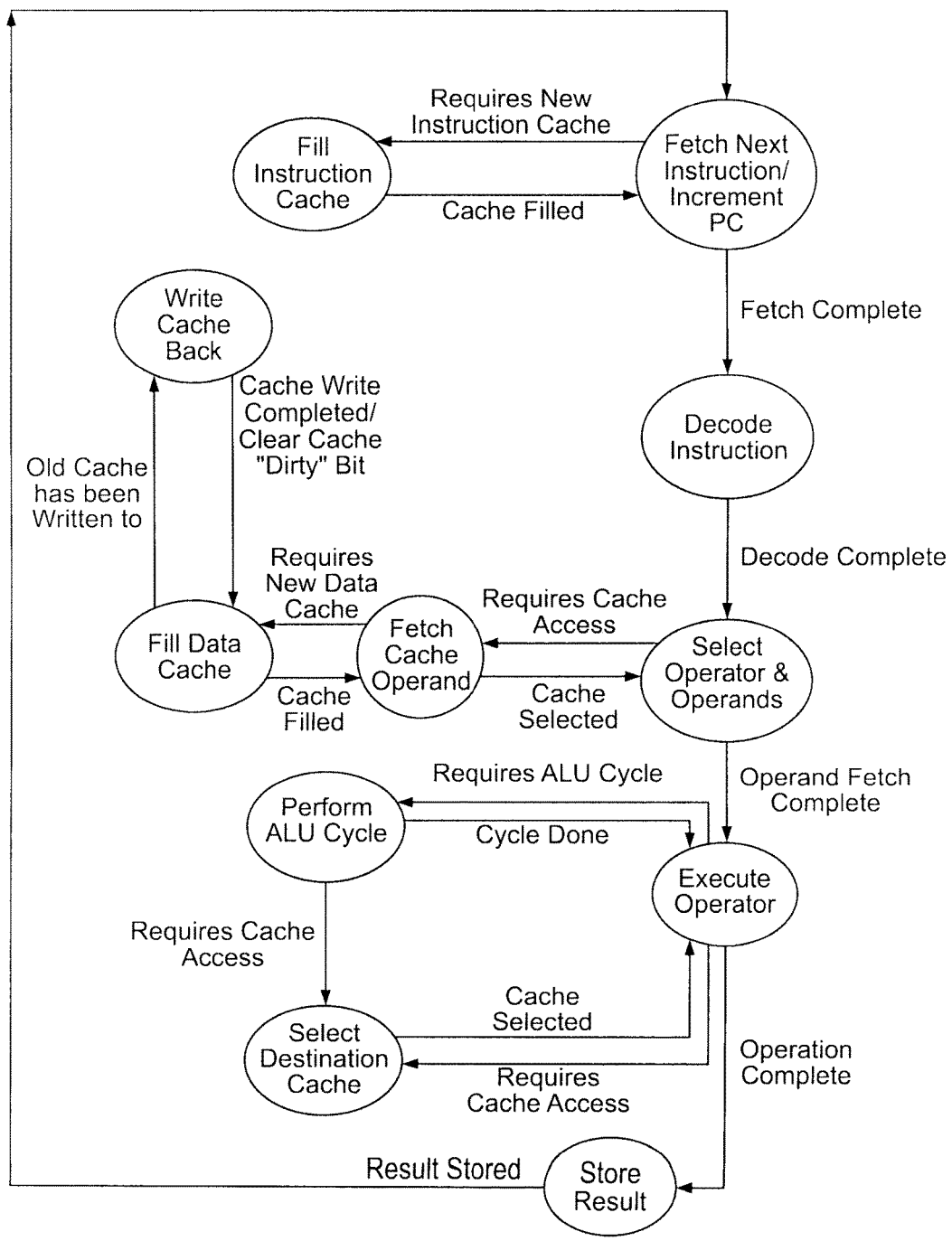
FIG. 6 depicts exemplary cache management states.

Caches may be stored and loaded based on changes of the associated memory addressing registers X, Y, PC, as illustrated in FIG. 6. For example, the total width of the PC register might be 24 bits. If the PC cache is 1024 bytes, the lower 10 bits of the PC would define access within the PC cache. When the PC is written such that there is a change in the upper 14 bits, a cache load cycle would be required. The TOMI CPU associated with that PC cache would stop executing until the cache load cycle was complete and the indicated instruction could be fetched from the PC cache.

Cache Double Buffering

A secondary cache may be loaded in anticipation of the cache load requirement. The two caches would be identical and alternately be selected and deselected based on the contents of the upper 14 bits of the PC. In the example above, when the upper 14 bits of the PC changed to match that of the data pre-cached in the secondary cache, the secondary cache would become selected as the primary cache. The old primary cache would now become the secondary cache. Since most computer programs linearly increase in memory, one embodiment of the invention would have the secondary cache always fetching the contents of the cache contents of main memory referenced by the upper 14 bits of the current PC plus 1.

The addition of secondary caches will reduce the time the TOMI processor must wait for memory data to be fetched from main memory when moving outside of the boundary of the current cache. The addition of secondary caches nearly doubles the complexity of a TOMI processor. For an optimal system, this doubling of complexity should be offset by a corresponding doubling of performance of the TOMI processor. Otherwise, two simpler TOMI processors without secondary cache can be implemented with the same transistor count.

High Speed Multiply, Floating Point Operations, Additional Functionality

Integer multiplication and all floating point operations require many cycles to perform, even with special purpose hardware. Thus, these operations could be factored into other processors rather than included in the basic TOMI processor. However, a simple 16 bit.times.16 bit multiplier can be added to the TOMI CPU (using less than 1000 transistors) to provide additional functionality and versatility to the TOMI CPU architecture.

Figure 7A:
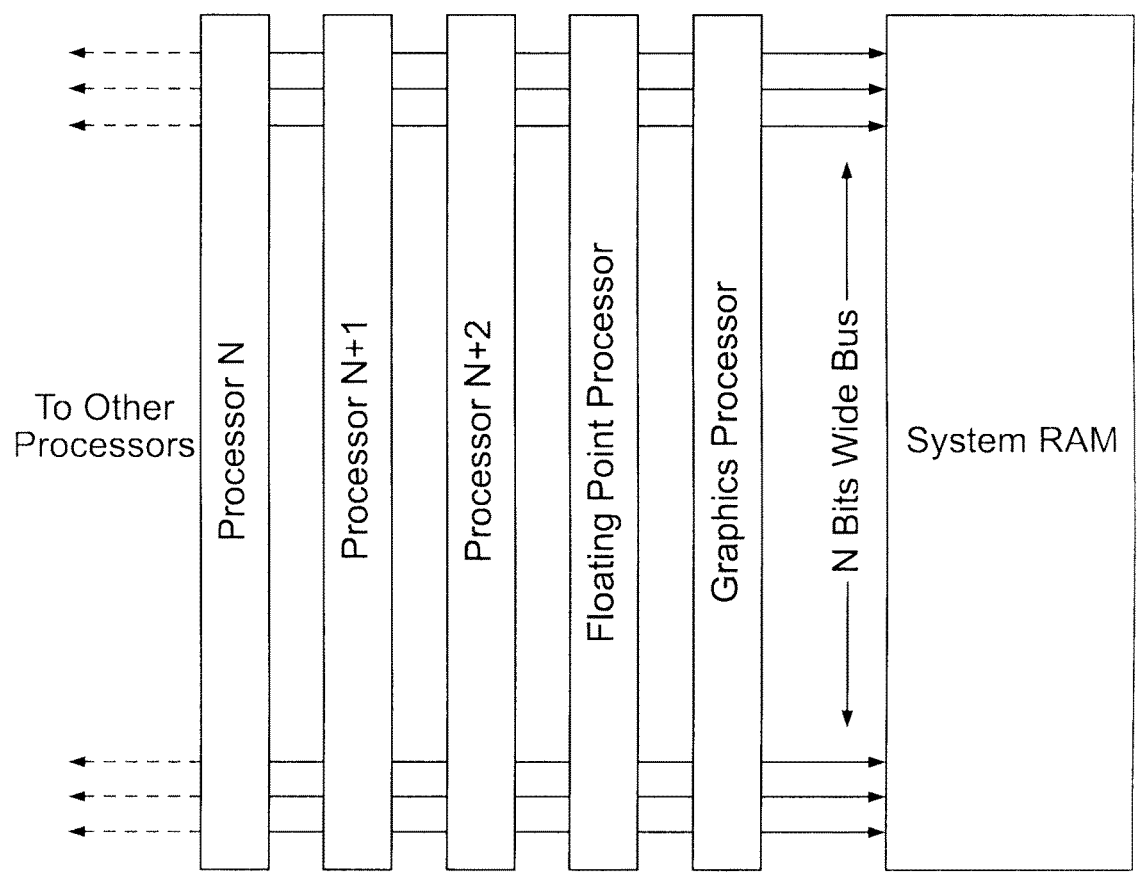
FIG. 7A shows one embodiment of additional processing functionality organized to take advantage of a wide system RAM bus.

Digital Signal Processing (DSP) operations often use deeply pipelined multipliers that produce a result every cycle even though the total multiplication may require many cycles. For signal processing applications that repeat the same algorithm over and over, such a multiplier architecture is optimal and may be incorporated as a peripheral processor to a TOMI processor, but it would likely increase complexity and reduce overall performance if it were incorporated directly in the TOMI processor. FIG. 7A shows one example of additional processing functionality organized to take advantage of the wide system RAM bus.

Accessing Adjacent Memory Banks

The physical layout design of the memory circuit in memory chips is often designed so that the memory transistors are laid out in large banks of memory cells. The banks are usually organized as equal sized rectangular areas and placed in two or more columns on the chip. The layout of memory cells in large banks of cells may be used to speed up the memory read and/or write accesses.

Figure 7B:
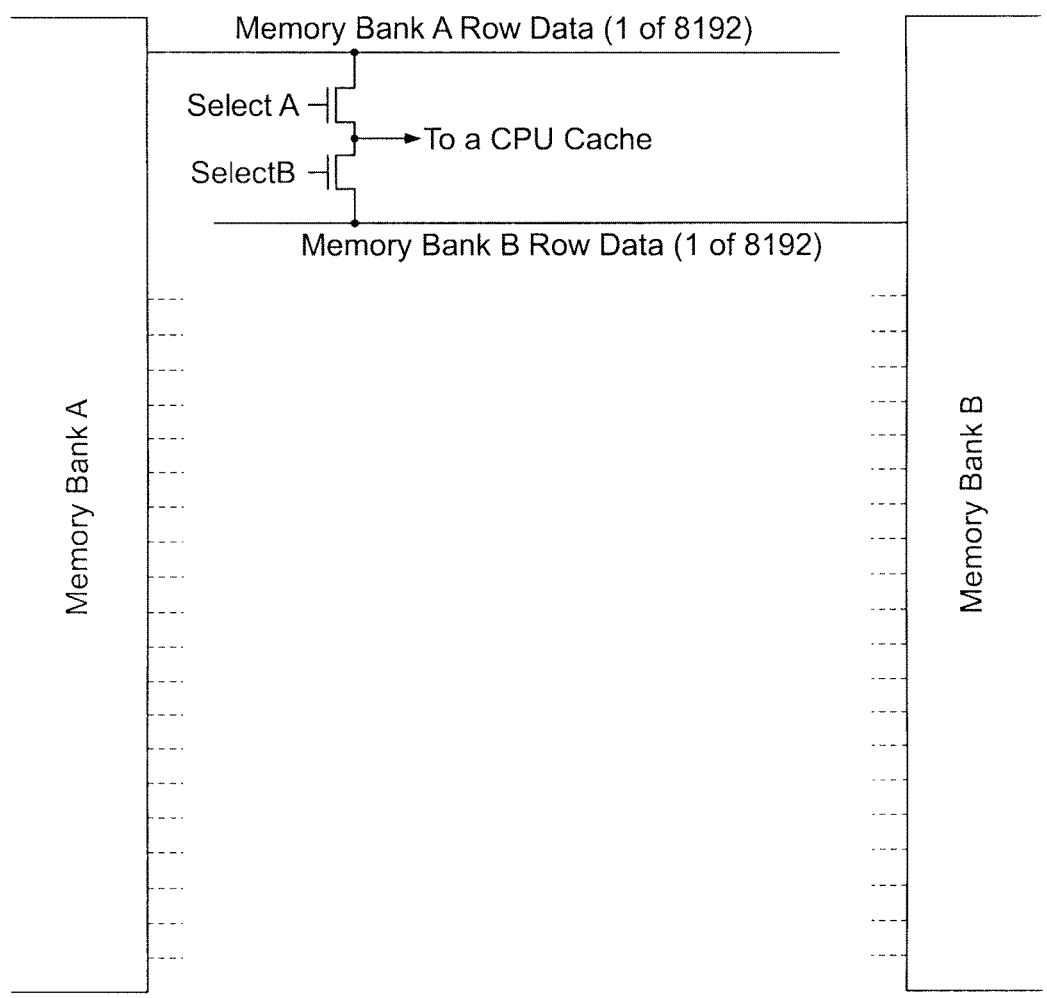
FIG. 7B shows an exemplary circuit for interleaving data lines for two memory banks accessed by a TOMI processor.

In one embodiment of the invention, one or more TOMI processors may be placed between two columns of memory cell banks in a memory chip. The row data lines of two memory banks may be interleaved such that using the logic shown in FIG. 7B, a TOMI processor may access either Memory Bank A or Memory Bank B by enabling Select A or Select B. In this manner, the memory directly addressable by a specific TOMI processor in a memory chip may be doubled.

TOMI Interrupt Strategy

An interrupt is an event external to the normal sequential operation of a processor that causes the processor to immediately change its sequence of operation. Examples of interrupts might be completion of an operation by an external device or an error condition by some hardware. Traditional processors go to great lengths to quickly stop normal sequential operation, save the state of current operation, begin performing some special operation to handle whatever event caused the interrupt, and when the special operation is completed restore the previous state and continue sequential operation. The primary metric of interrupt handling quality is the time to respond.

Interrupts pose several problems for traditional processors. They make execution time indeterminate. They waste processor cycles storing and then restoring status. They complicate processor design and can introduce delays that slow every processor operation.

Immediate interrupt response is unnecessary for most processors, with the exceptions being error handling and those processors directly interfacing to real world activity.

In one embodiment of a multiprocessor TOMI system, only one processor possesses primary interrupt capability. All other processors run uninterrupted until they complete some assigned work and stop themselves or until they are stopped by the coordinating processor.

Input/Output (I/O)

In one embodiment of the TOMI processor environment, a single processor is responsible for all interfacing to the external world.

Direct Memory Access (DMA) Control

In one embodiment, immediate response to the external world in a TOMI processor system occurs via a DMA controller. A DMA controller, when requested by an external device, transfers data from the external device to the internal data bus for writing to the system RAM. The same controller also transfers data from the system RAM to the external device when requested. A DMA request would have the highest priority for internal bus access.

Organizing an Array of TOMI Processors

Figure 8:
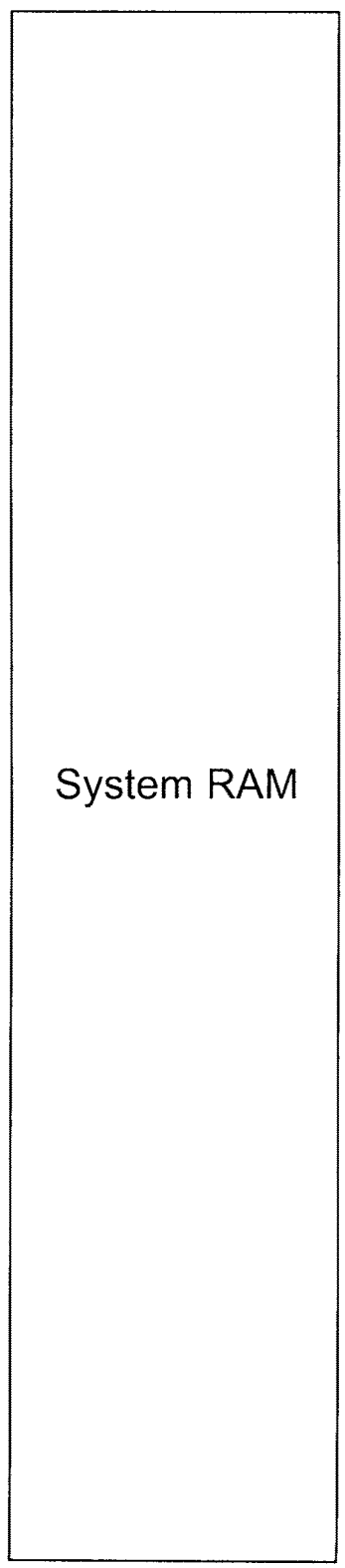
FIG. 8 depicts an exemplary memory map.

The TOMI processor of preferred embodiments of the invention is designed to be replicated in large numbers and combined with additional processing functionality, a very wide internal bus, and system memory on a monolithic chip. An exemplary memory map for such a system is illustrated in FIG. 8.

The memory map for each processor dedicates the first 32 locations (1F hex) to the local registers for that processor (see FIG. 3). The remainder of the memory map is addressable by all processors through their cache registers (see FIG. 6). The addressability of the system RAM is limited only by the width of the three registers associated with the local caches; PC, X, and Y. If the registers are 24 bits wide, the total addressability would be 16 Mbytes, but there is no upper limit.

In one embodiment, 64 TOMI processors are implemented monolithically with memory. A single master processor is responsible for managing the other 63. When one of the slave processors is idle, it is not clocking so it consumes little or no power and generates little or no heat. On initialization, only the master processor is operational. The master begins fetching and executing instructions until a time that a thread should be started. Each thread has been precompiled and loaded into memory. To start a thread, the master allocates the thread to one of the TOMI CPUs.

Processor Availability

Coordination of the availability of TOMI processors to do work preferably is handled by the Processor Availability Table shown in FIG. 9. The coordinating (master) processor preferably can perform the following functions:

1. Push the calling parameters for a slave processor onto its stack, including but not limited to the execution address of the thread, the source memory, and the destination memory.

2. Start a slave processor.

3. Respond to a slave processor thread completion event either by polling or by responding to an interrupt.

Requesting a Processor

The coordinating processor may request a processor from the availability table.

Figure 10:
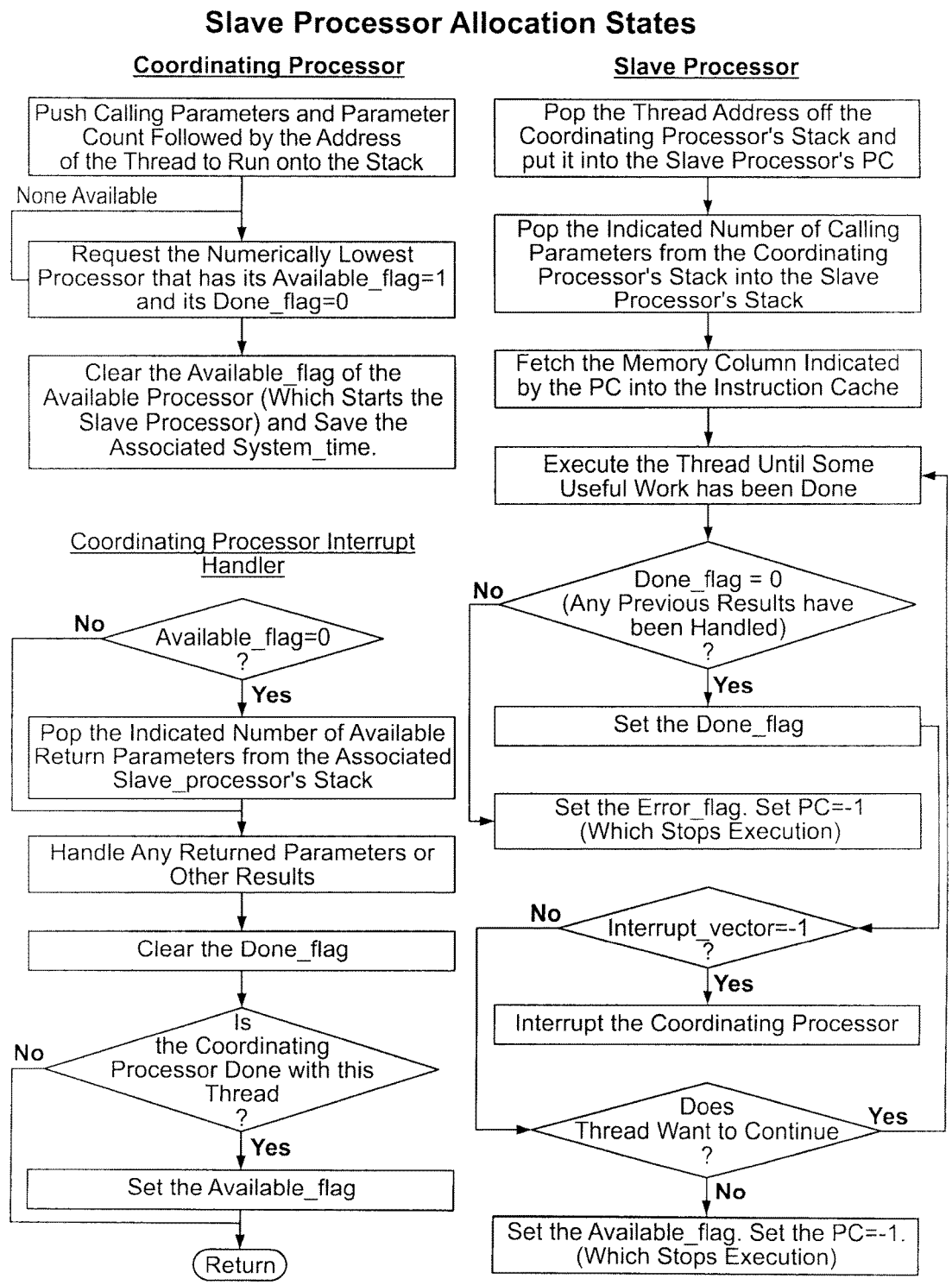
FIG. 10 illustrates three components of processor allocation.

The number of the lowest processor with an available_flag set to "0" is returned. The coordinating processor may then set the available_flag associated with the available processor to "1", thereby starting the slave processor. If no processor is available, the request will return an error. Alternatively, processors may be allocated by the coordinating processor based upon a priority level associated with the requested work to be performed. Techniques to allocate resources based upon priority schemes are well-known in the art. FIG. 10 illustrates three preferred components of processor allocation; Coordinating Processor initiating operations, Slave Processor operations, and Coordinating Processor result handling through interrupt response.

Step-by-Step Starting a Slave Processor

1. Coordinating processor pushes the parameters for the thread to run onto its own stack. Parameters may include: starting address of the thread, source memory for the thread, destination memory for the thread, and last parameter_count.

2. Coordinating processor requests an available processor.

3. Processor allocation logic returns either the number of the numerically lowest slave processor that has both its associated available_flag set and its associated done_flag cleared, or an error.

4. If an error was returned, the coordination processor may either retry the request until a slave processor becomes available or perform some special operation to handle the error.

5. If an available processor number was returned, the coordinating processor clears the available_flag for the indicated processor. This operation pushes the parameter_count number of stack parameters to the stack of the selected slave processor. The done_flag is cleared to zero.

6. The slave processor retrieves the top stack item and transfers it to the slave processor's program counter.

7. The slave processor then fetches the memory column indicated by the program counter into the instruction cache.

8. The slave processor begins executing instructions from the beginning of the instruction cache. The first instructions will likely retrieve the calling parameters from the stack.

9. The slave processor executes the thread from the instruction cache. When the thread completes, it checks the state of its associated done_flag. If the done_flag is set, it waits until the done_flag is cleared, indicating the coordinating processor has handled any previous results.

10. If the interrupt vector associated with the slave processor is set to −1, no interrupt will be created by setting the done_flag. The coordinating processor may therefore poll for the done_flag to be set.

When the coordinating processor detects that the done_flag is set, it may handle the slave processor's results and possibly reassign the slave processor to do new work. When the slave processor's results have been processed, the associated coordinating processor will clear the associated done_flag.

If the interrupt vector associated with the slave processor is not equal to −1, setting the associated done_flag will cause the coordinating processor to be interrupted and begin executing an interrupt handler at the interrupt vector address.

If the associated available_flag has been set also, the coordinating processor may also read the return parameters pushed on the slave processor's stack.

The interrupt handler will handle the slave processor's results and possibly reassign the slave processor to do new work. When the slave processor's results have been processed, the interrupt handler running on the coordinating processor will clear the associated done_flag.

11. If the done_flag is clear, the slave processor sets its associated done_flag and saves the new start_time. The slave processor may continue to do work or may return to the available state. To return to the available state, the slave processor may push return parameters onto its stack, followed by a stack count and set its available_flag.

Managing TOMI Processors Using Memory Mode Register

Figure 10A:
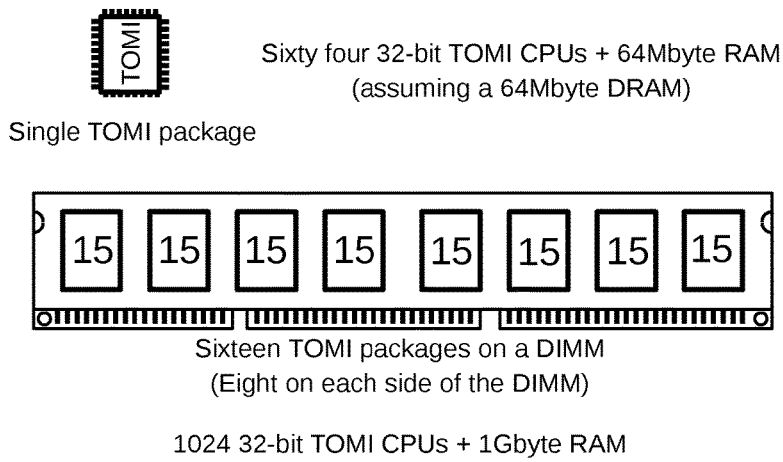
FIG. 10A illustrates an embodiment of multiple TOMI processors on a DIMM package.
Figure 10B:
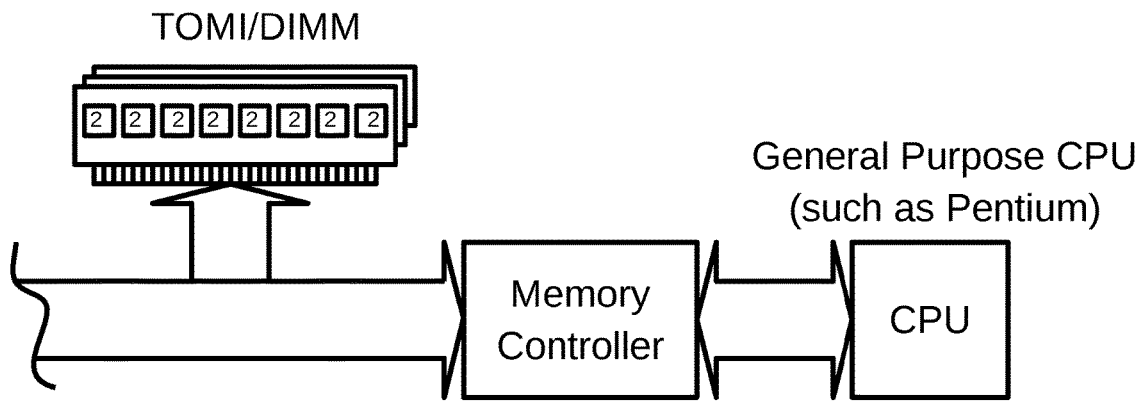
FIG. 10B illustrates an embodiment of multiple TOMI processors on a DIMM package interfacing with a general purpose CPU.

One technique for implementing and managing multiple TOMI processors is to mount the TOMI processors on a dual inline memory module (DIMM) as shows in FIG. 10A. The TOMI/DIMM can be included in a system consisting of an external memory controller and a general purpose CPU such as a personal computer. FIG. 10B. shows such a configuration. A mode register is commonly found in DRAMs, SRAMs and FLASH memories. The mode register is a set of latches that may be written by an external memory controller independent of memory access. Bits in the memory mode register are often used to specify parameters such as timing, refresh control, and output burst lengths.

One or more bits can be allocated in a memory mode register to enable or disable the TOMI CPUs. For example, when the TOMI CPUs are disabled by the mode register, the memory containing the TOMI CPUs would function as a normal DRAM, SRAM or FLASH memory. When the mode register enables TOMI CPU initialization, the sequence will be performed as described in FIG. 1 OC. In this embodiment, a single processor is determined to be the Master Processor. It is this processor that always starts first following a RESET operation. At the end of initialization, the master processor will be running at full speed and executing the desired application program. While the TOMI CPUs are executing, the DRAM, SRAM, or FLASH memory will be inaccessible. From time to time the Memory Mode Register may be directed by the external memory controller to halt execution of the TOMI CPUs. When the TOMI CPUs are halted, the contents of the DRAM, SRAM, or FLASH may be read by the external memory controller attached to a general purpose CPU. In this way, results may be passed to the general purpose CPU and additional data or executables may be written to the DRAM, SRAM, or FLASH memory.

Figure 10D:
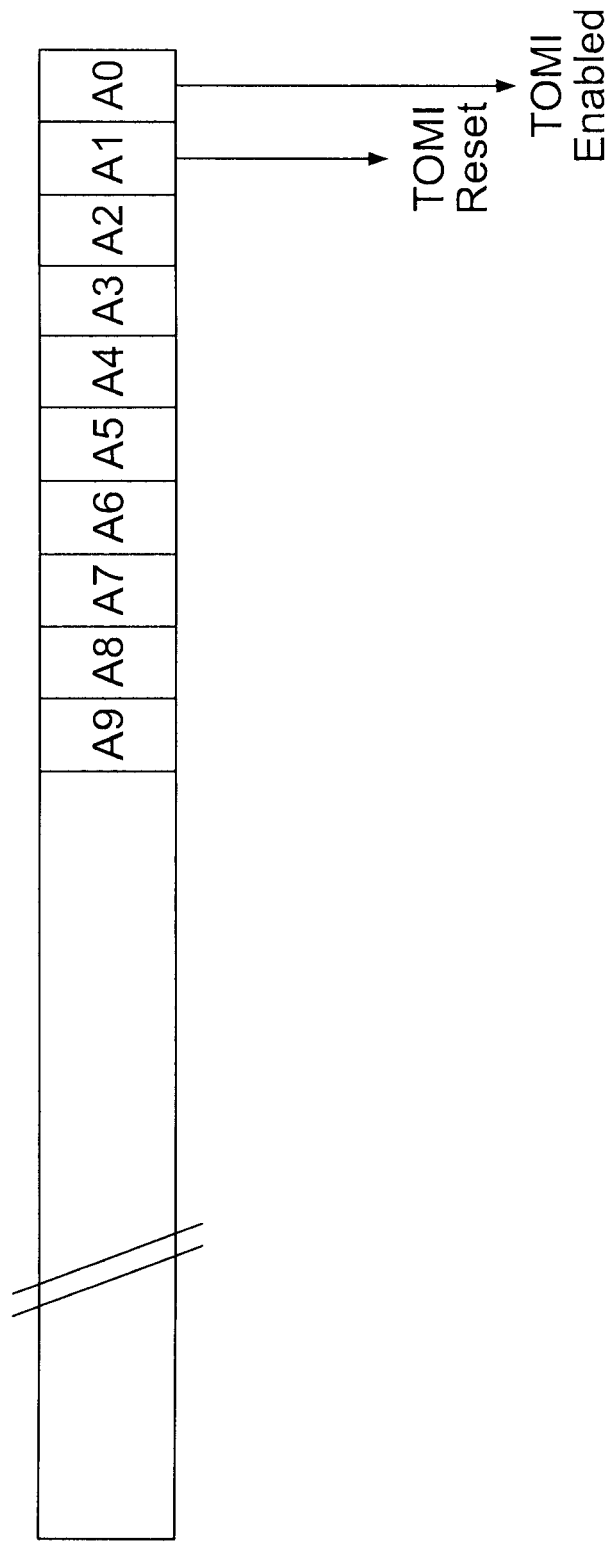
FIG. 10D illustrates use of a memory mode register for TOMI processor initialization.

When the general purpose CPU has completed any reads or writes of the DRAM, SRAM, or FLASH memory, the external memory controller will write the mode register bit from HALT to RUN and execution of the TOMI CPUs will continue executing from where they left off. FIG. 10D shows a typical Memory Mode Register from a DRAM, SRAM, or FLASH memory and how that register will be modified to control the TOMI CPUs.

Adjusting Processor Clock Speed

Processor clock speed determines processor power dissipation. The TOMI architecture enables low power dissipation by allowing all but one processor to be stopped. Furthermore, each processor other than the Master Processor may have its clock speed adjusted to optimize either performance or power consumption using the logic shown in FIG. 2D.

Another Embodiment of TOMI Processor Management

Some computer software algorithms are recursive. In other words, the primary function of the algorithm calls itself. The class of algorithms known as "divide and conquer" is often implemented using recursive techniques. Divide and conquer is applicable to searches and sorts of data, and certain mathematical functions. It may be possible to parallelize such algorithms with multiple processors such as those available with the TOMI architecture. In order to implement such algorithms, one TOMI CPU must be able to pass work to another TOMI CPU and receive the results from that CPU. Another embodiment of the TOMI processor allows any processor to be a Master Processor and treat any other available TOMI processor as a Slave Processor. Starting and stopping TOMI processors, communicating between processors, and managing independent and dependent threads is supported in this embodiment of processor management.

Stopping a TOMI CPU

A TOMI CPU may be stopped by writing all 1's to its PC. When a TOMI CPU is stopped, its clock is not running and it's not consuming power. Any TOMI CPU may write all 1's to its own PC.

Starting a TOMI CPU

A TOMI CPU may start executing when a value other than all 1's is written to its PC. The master processor has a value of 0 written to its PC when it is reset by the mode register as shown in FIG. 10D.

Independent Processor Threads

When multiple threads execute on a single general purpose processor, those threads may be very loosely coupled, only communicating infrequently. Rather than run, return results, and stop, some threads may run forever, delivering results continuously and in perpetuity. An example of such threads would be a network communications thread or a thread reading a mouse device. The mouse thread runs continuously and delivers mouse position and click information either to a shared memory area where it can be polled or to a callback routine where it is immediately presented.

Such independent threads are primarily used to simplify programming rather than to accelerate performance. Similar threads can be executed on a multiprocessor system such as TOMI. The results may be delivered to a shared memory area. In some cases, communications may be accomplished through a shared variable.

In the TOMI architecture, a shared variable may be more efficient than shared memory since the variable can avoid the necessity for a memory RAS cycle to load a complete row to the X_cache or Y_cache. An example of use of a variable would be an input pointer to a receive buffer for a TOMI CPU monitoring network traffic. The network monitoring CPU would increment the variable as data is received. The data consuming CPUs would read the variable from time to time and when enough data was present, perform an operation to load a memory row into either the X_cache or Y_cache.

The received network data could then be read from the cache up to the value indicated by the shared variable.

Dependent Processor Threads

Some algorithms (such as those classified as divide and conquer) can achieve parallelism by simultaneously executing pieces of the algorithm on several processors and combining the results. In such a design, a single Master Processor will request work from several Slave Processors and then wait while the slaves perform the work in parallel. In this way, the Master Processor is dependent on work being completed by the slave processors.

When a Slave Processor's work is completed, the Master Processor will read the partial results and combine them into the final result. This capability enables the TOMI architecture to efficiently process a class of algorithms known as "divide and conquer." Some of the more common simple divide and conquer algorithms are searches and sorts.

Multiprocessor Management Instruction Set Extensions

A series of extensions to the basic TOMI instruction set enable both independent and dependent thread management. These instructions would be implemented using some of the available NOOP codes shown in FIG. 2B. These management extension instructions are summarized in FIG. 2C.

GETNEXTPROCESSOR—This instruction queries the processor availability table and loads the ACC with a number associated with the next available processor.

SELECTPROCESSOR—This instruction writes the ACC to the Processor Select Register. The Processor Select Register selects which processor will be evaluated by TESTDONE and READSHAREDVARIABLE.

STARTPROCESSOR—This instruction writes to the PC of the processor selected by the Processor Select Register. This instruction is most likely to be executed when a master processor wants to start a slave processor that is stopped. A slave processor stopped if its PC is all 1's. By writing a value to the PC of the slave processor, the master processor will cause the slave processor to begin running a program at the location of the written PC. If the operation was successful, the ACC will contain the PC value being written to the selected processor. If the operation was not successful, the ACC will contain −1. The most likely reason for a failed operation is that the selected processor was unavailable.

TESTDONE—This instruction tests the PC of the processor selected by the Processor Select Register and sets the C bit of the calling processor to "1" if the PC=all ones. In this manner a loop testing the PC may be created as follows:
TABLE-US-00006 LOADI, processorNumber SELECTPROCESSOR LOADACC, LOOPADDRESS TOP TESTDONE STOREACC, PC_COND//Loop to TOP until the selected processor is stopped with PC=all 1s.

TESTAVAILABLE—This instruction tests the "available" bit in the Processor Availability Table for the processor selected by the Processor Select Register and sets the C bit of the calling processor to "1" if the selected processor is available. In this manner a loop to test the availability for further work may be created as follows:
LOADI, processor Number
SELECTPROCESSOR
LOADACC, LOOPADDRESS
TOP TESTAVAILABLE
STOREACC, PC_COND//Loop to TOP until the selected processor is available.

Figure 10E:
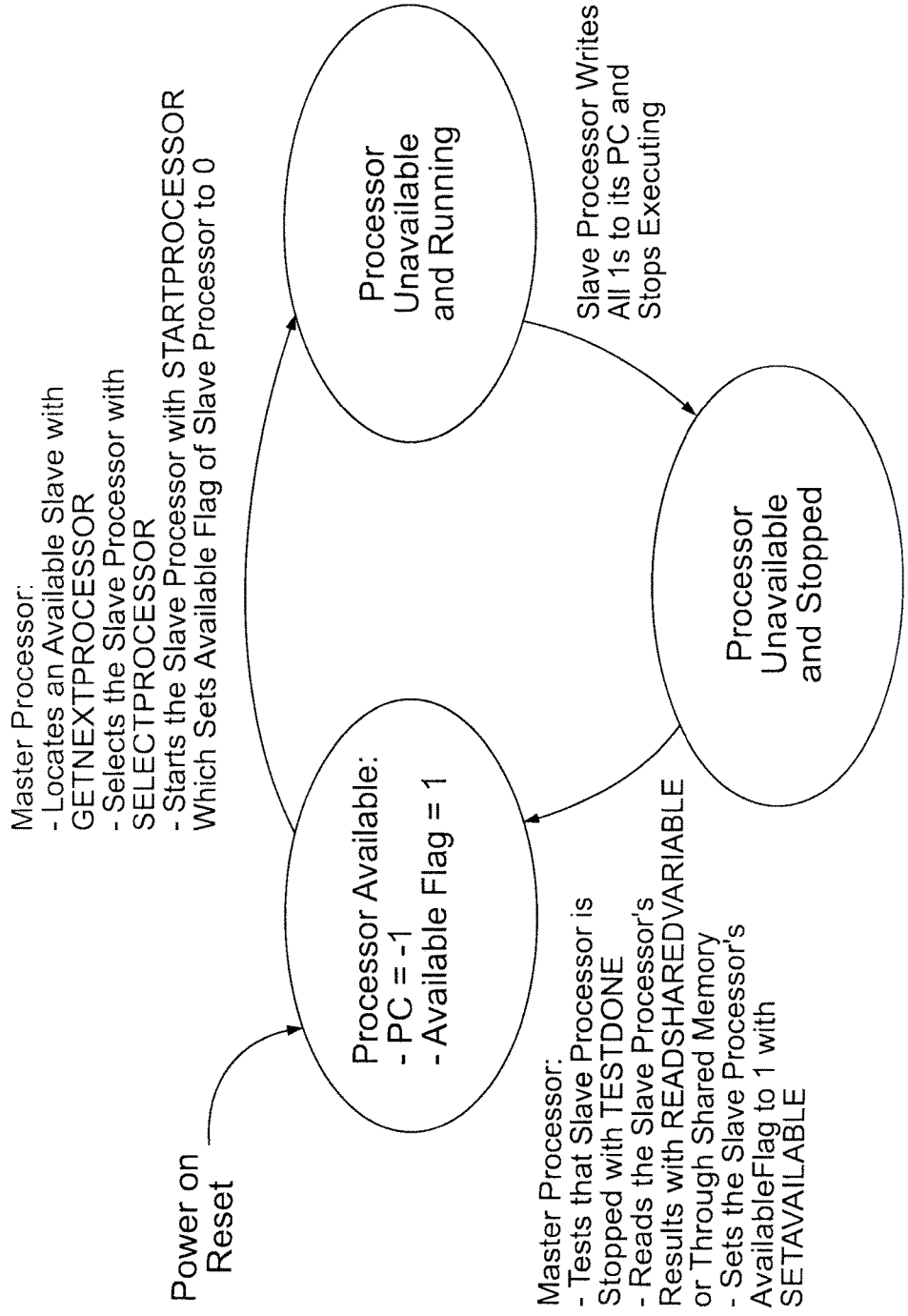
FIG. 10E depicts an exemplary TOMI processor availability state diagram.

SETAVAILABLE—This instruction sets the "available" bit in the Processor Availability Table for the processor selected by the Processor Select Register. This instruction will most likely be executed by one processor, which has requested that another processor do work as shown in FIG. 10E. When the working processor completes its work, it stops by setting its PC to all 1s. The requesting processor will periodically TESTDONE for the working processor. When the working processor has completed its work, the requesting processor will read the results either through a shared memory location or through a shared variable. When the results have been read, the working processor is available to be reassigned another task, and the requesting processor will use SETAVAILABLE so that other processors may request it to do further work.

READSHAREDVARIABLE—This instruction reads the Shared Variable of the processor selected by the Processor Select Register. This instruction will most likely be executed by one processor, which has requested that another processor do work. The Shared Variable may be read by any processor to determine the progress of the assigned work. As an example, the working processor might be assigned to process data being received from a high speed network. The Shared Variable would indicate the amount of data that had been read and was available to other processors. Each processor contains a Shared Variable. That Shared Variable may be read by any other processor, but a Shared Variable may only be written by its own processor.

STORESHAREDVARIABLE—This instruction writes the value of the ACC to the Shared Variable of the processor executing the instruction. The Shared Variable may be read by any other processor and is used to communicate status and results to other processors.

Interprocessor Communications Using Data Ready Latches

Figure 10F:
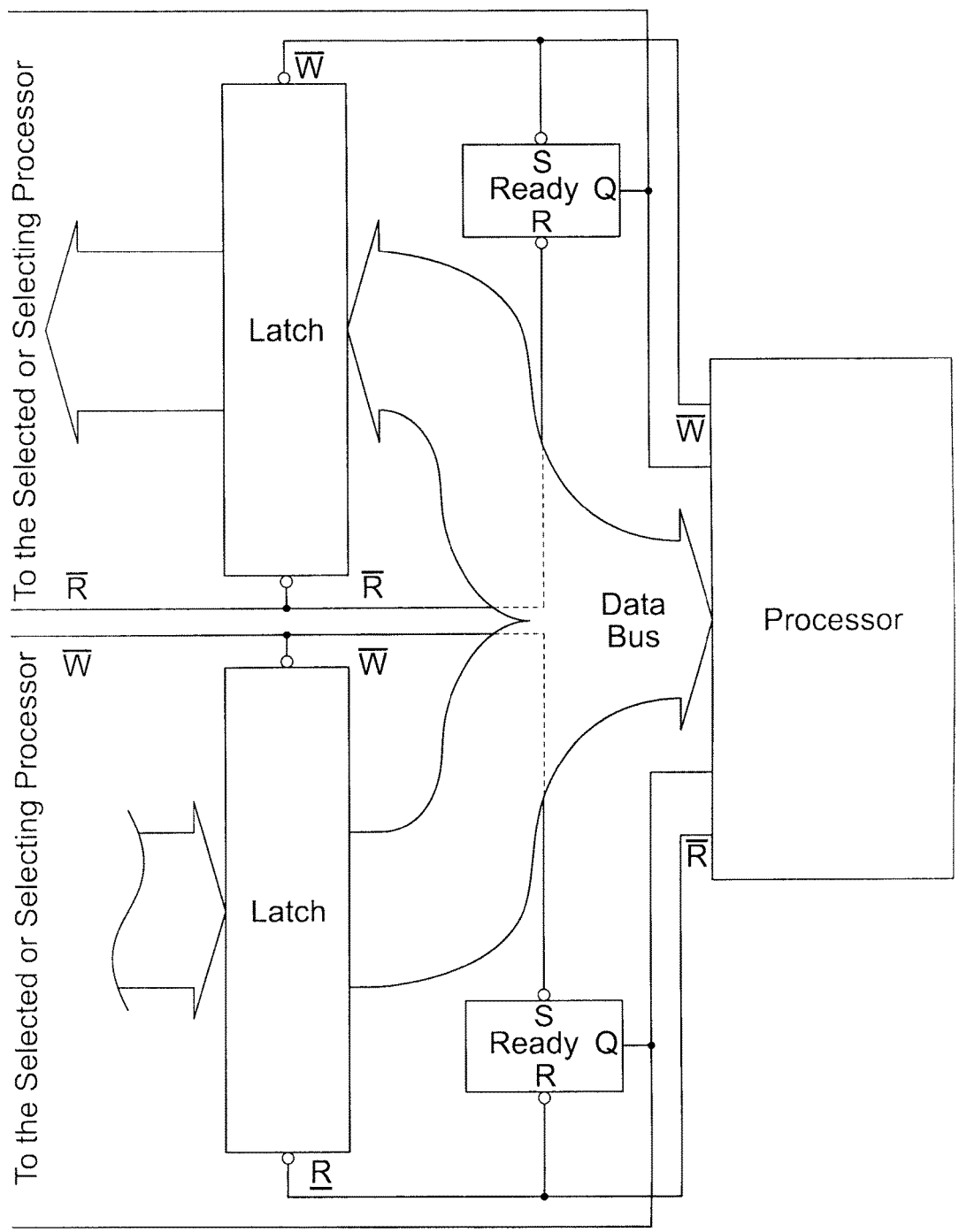
FIG. 10F shows an exemplary interprocessor communication circuit design.

FIG. 10F illustrates one possible hardware implementation of communications between TOMI processors. One TOMI processor may establish a connection between itself and another TOMI processor using the SELECTPROCES- SOR command. This instruction creates a logical connection that allows the selecting and selected processors to exchange data using a shared register and the READSHAREDVARIABLE and STORESHAREDVARIABLE commands.

The top half of FIG. 10F shows the logic for the processor to send data to another processor controlled by a ready flag register. The bottom half of FIG. 10F shows the logic for the processor to receive data from another processor controlled by a ready flag register.

The status of the shared register may be read into the C bit of either the selecting or selected processors. In operation, a processor writes data to its shared register thereby setting the associated data ready flag. The connected processor reads its shared register until the C bit indicates that the associated data ready flag has been set. The read operation clears the ready flag so the process can repeat.

Arbitrating Processor Allocation

As described above, a TOMI processor can delegate work to another TOMI processor whose availability has been determined by GETNEXTPROCESSOR.

GETNEXTPROCESSOR determines if a processor is available. An available processor is one that is not currently performing work and is not holding results of previous work which have not yet been retrieved by READSHAREDVARIABLE.

Figure 10G:
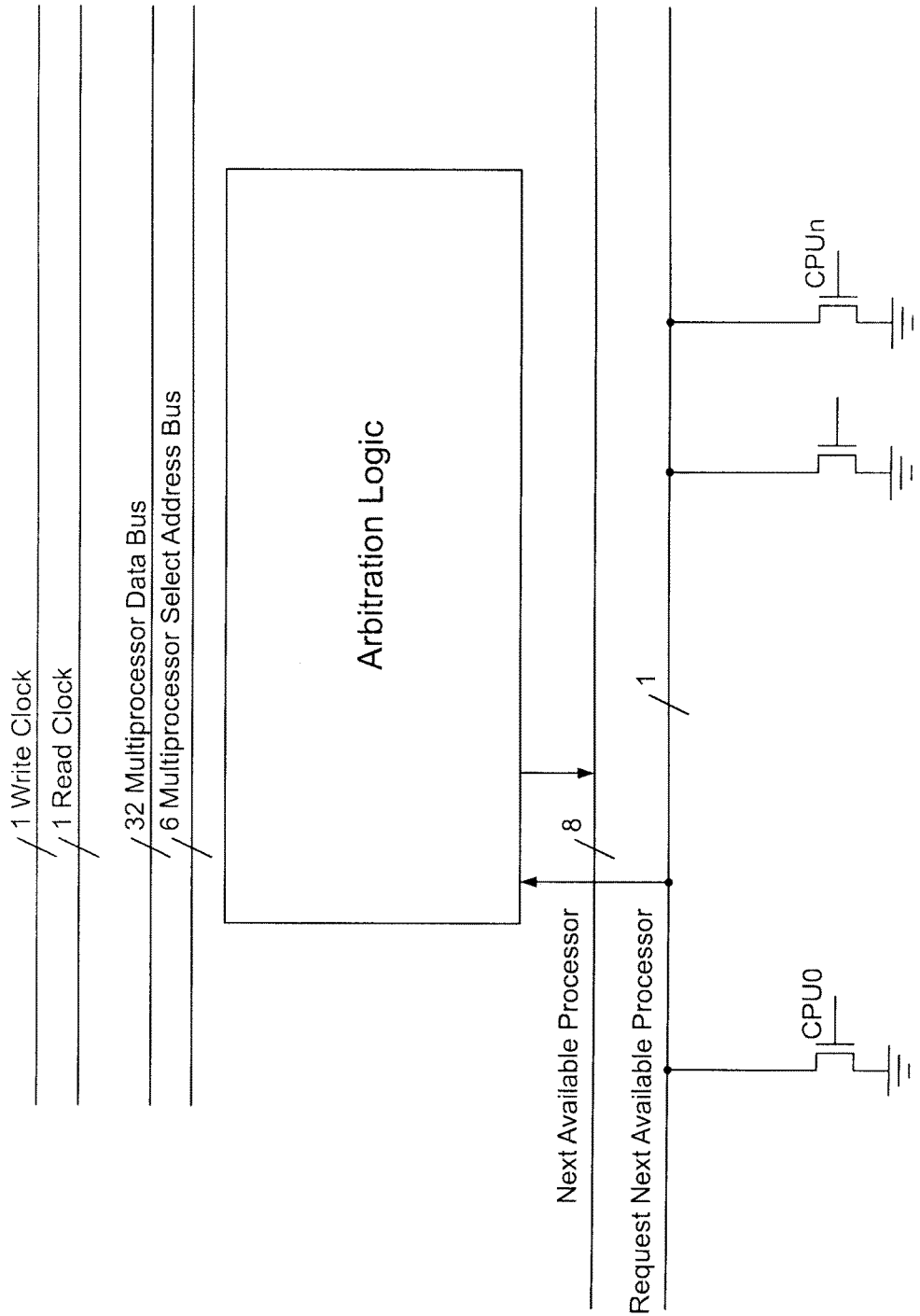
FIG. 10G shows an exemplary hardware implementation to identify a TOMI processor to perform work.
Figure 10H:
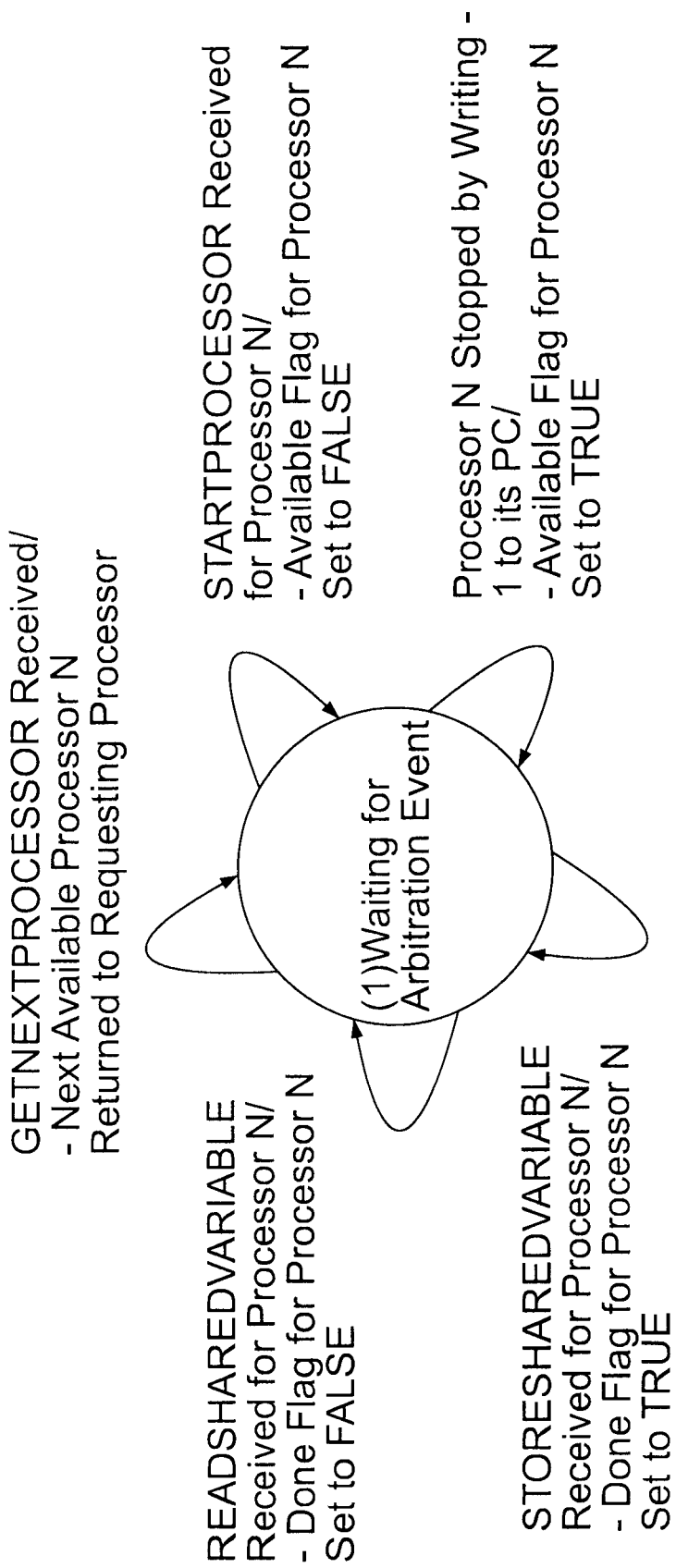
FIG. 10H shows an exemplary processor arbitration diagram.
Figure 10I:
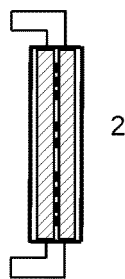
FIG. 10I shows an exemplary Single TOMI Processor Side View With 2 Layers of Metal and Interconnect.
Figure 10J:
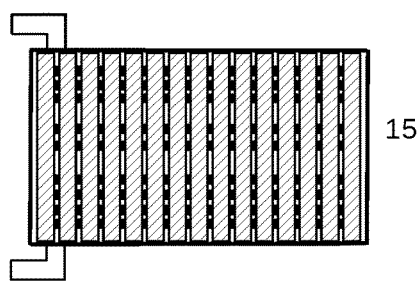
FIG. 10J shows an exemplary Single TOMI Processor Side View With 15 Layers of Metal and Interconnect.

FIG. 10G shows one hardware implementation to identify an available processor to which work can be delegated. FIG. 10H shows the events of an exemplary processor arbitration. The process is as follows:

1. The requesting processor executes a GETNEXTPROCESSOR instruction which pulls down the "Request Next Available Processor" line to the Arbitration Logic.

2. The Arbitration Logic produces a number corresponding to a TOMI CPU on the "Next Available Processor" lines.

3. The requesting processor executes a SELECTPROCESSOR instruction which stores the number in the requesting processor's PSR (Processor Select Register).

4. The requesting processor then executes a STARTPROCESSOR instruction which writes to the PC of the processor selected by the Processor Select Register. If the operation was successful, the number of the selected processor is also stored to the Arbitration Logic to indicate that the selected processor is no longer available to be assigned to do work. If the operation was unsuccessful, the reason is probably that the selected processor is not available. The requesting processor will execute another GETNEXTPROCESSOR to find another available processor.

5. When the selected processor executes STORESHAREDVARIABLE to make its results available, the Arbitration Logic is notified that the selected processor has results waiting to be read.

6. When the selected processor is stopped by writing −1 to its PC, the Arbitration Logic is notified that the selected processor is available.

7. When the selected processor's results are retrieved by READSHAREDVARIABLE, the Arbitration Logic is notified that the selected processor's results have been read.

Memory Locking

TOMI processors read and write system memory through their caches. A completely cached column is read or written at one time. Any processor may read any portion of system memory. An individual processor may lock a column of memory for its exclusive writing. This locking mechanism avoids memory writing conflicts between processors.

Suggested Applications

Parallelism effectively accelerates applications that may be factored into independent pieces of work for individual processors. One application that factors nicely is image manipulation for robotic vision. Image manipulation algorithms include correlation, equalization, edge identification, and other operations. Many are performed by matrix manipulation. Very often the algorithms factor nicely, as illustrated in FIG. 11.

Figure 11:
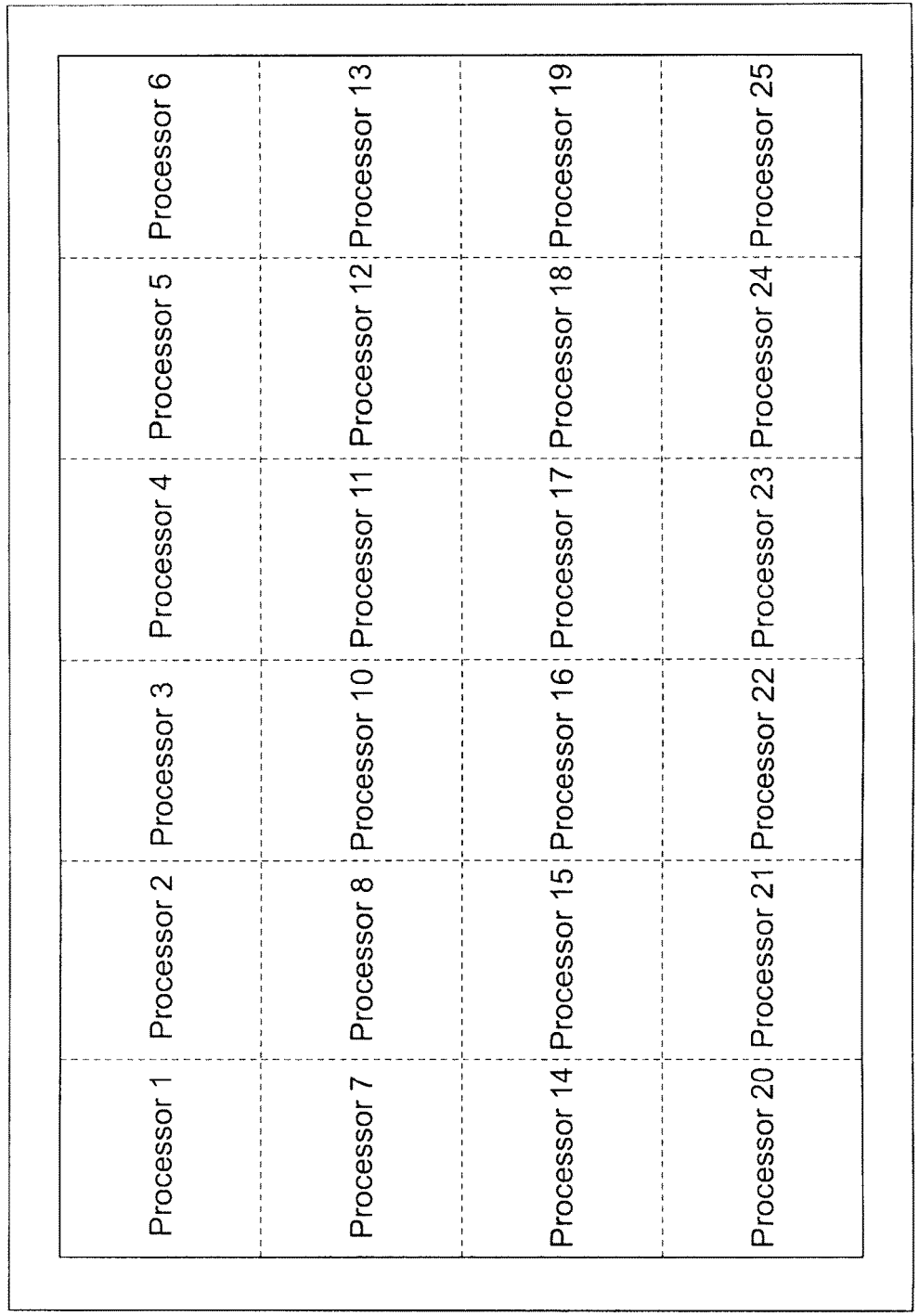
FIG. 11 depicts exemplary factoring.

In FIG. 11, the example imagemap shows 24 processors, with a processor allocated to manipulate the image data for a rectangular subset of the total imagemap.

FIG. 12 shows how the TOMI system RAM may be allocated in one embodiment. One block of system RAM holds the image capture pixels, and another block holds the processed results.

In operation, the coordinating processor has allocated a DMA channel to transfer the image pixels from an external source to the internal system RAM every fixed amount of time. A typical speed of image capture might be 60 images per second.

The coordinating processor then enables slave processor 1 by pushing the address of the imagemap to be used by the X register, the address of the processed image to be used by the Y register, the parameter count of 2, and the address of the image processing algorithm. The coordinating processor subsequently and similarly enables processors 2 through 25. The processors continue to execute independently and in parallel until the image processing algorithm is completed.

When the algorithm is completed, each processor sets its associated done_flag in the Processor Availability Table. The results are handled by the coordinating processor, which is polling for completion or responding to an interrupt on the "done" event.

Figure 13A:
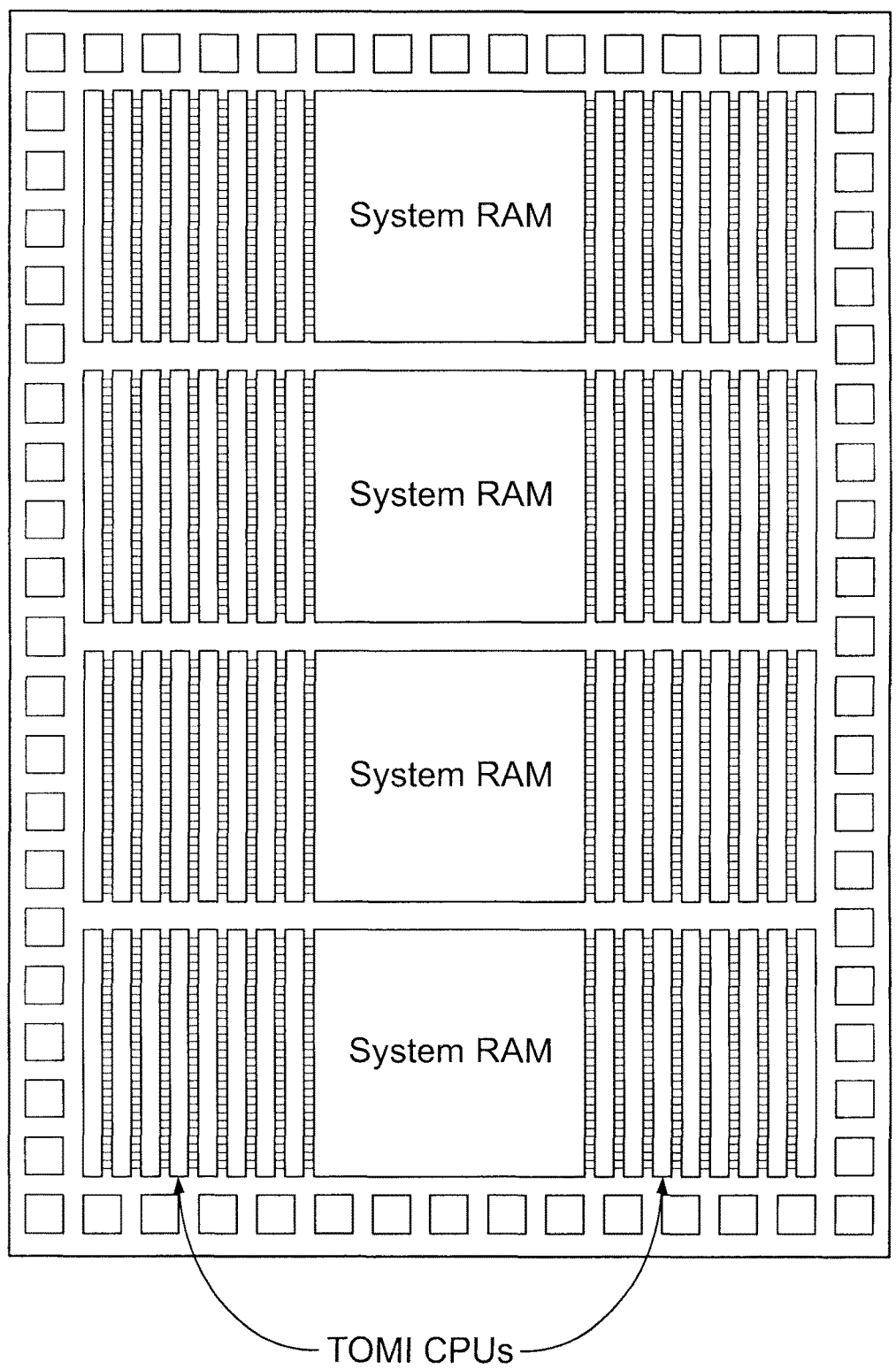
FIG. 13A depicts an exemplary floorplan for a monolithic array of 64 TOMI processors.
Figure 13B:
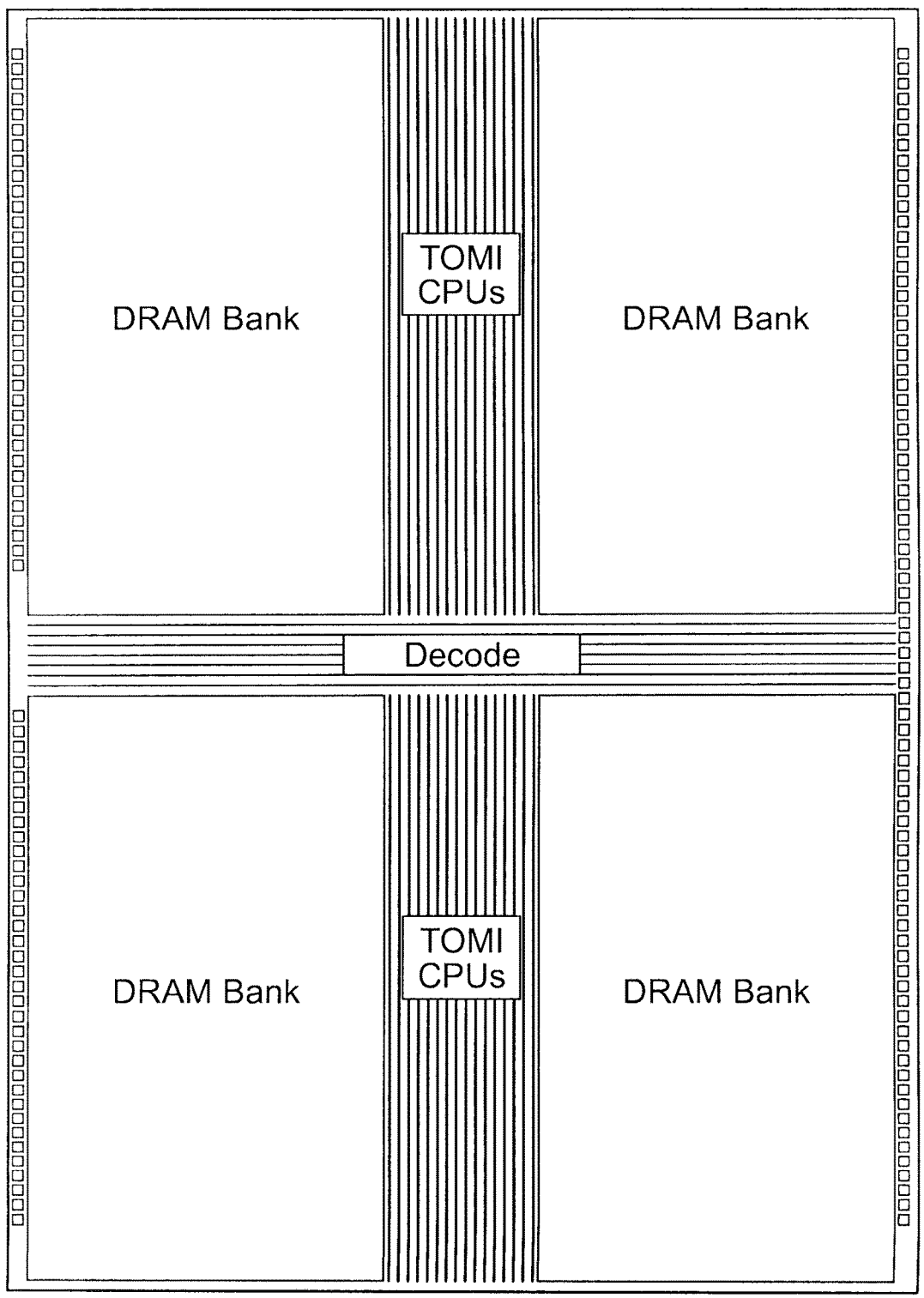
FIG. 13B depicts another exemplary floorplan for a monolithic array of TOMI processors.

FIGS. 13A and 13B show exemplary floorplans for a monolithic array of 64 TOMI processors implemented with on-chip system memory. The floorplan may vary depending upon the circuit design and layout of the memory circuit and the overall chip architecture.

TOMI Peripheral Controller Chip (TOMIPCC)

One embodiment of the TOMI architecture embeds one or more TOMI CPUs in a standard DRAM die. The resulting die is packaged in the standard DRAM package with the standard DRAM pinout. The packaged part may be mounted on the standard DRAM DIMM (dual inline memory module).

In operation, this embodiment behaves like a standard DRAM except when the embedded TOMI CPUs are enabled through the DRAM mode register. When the TOMI CPUs are enabled and operating, they execute programs loaded to the DRAM by an external processor. The results of TOMI CPU calculations are provided to the external processor through the shared DRAM.

Figure 14A:
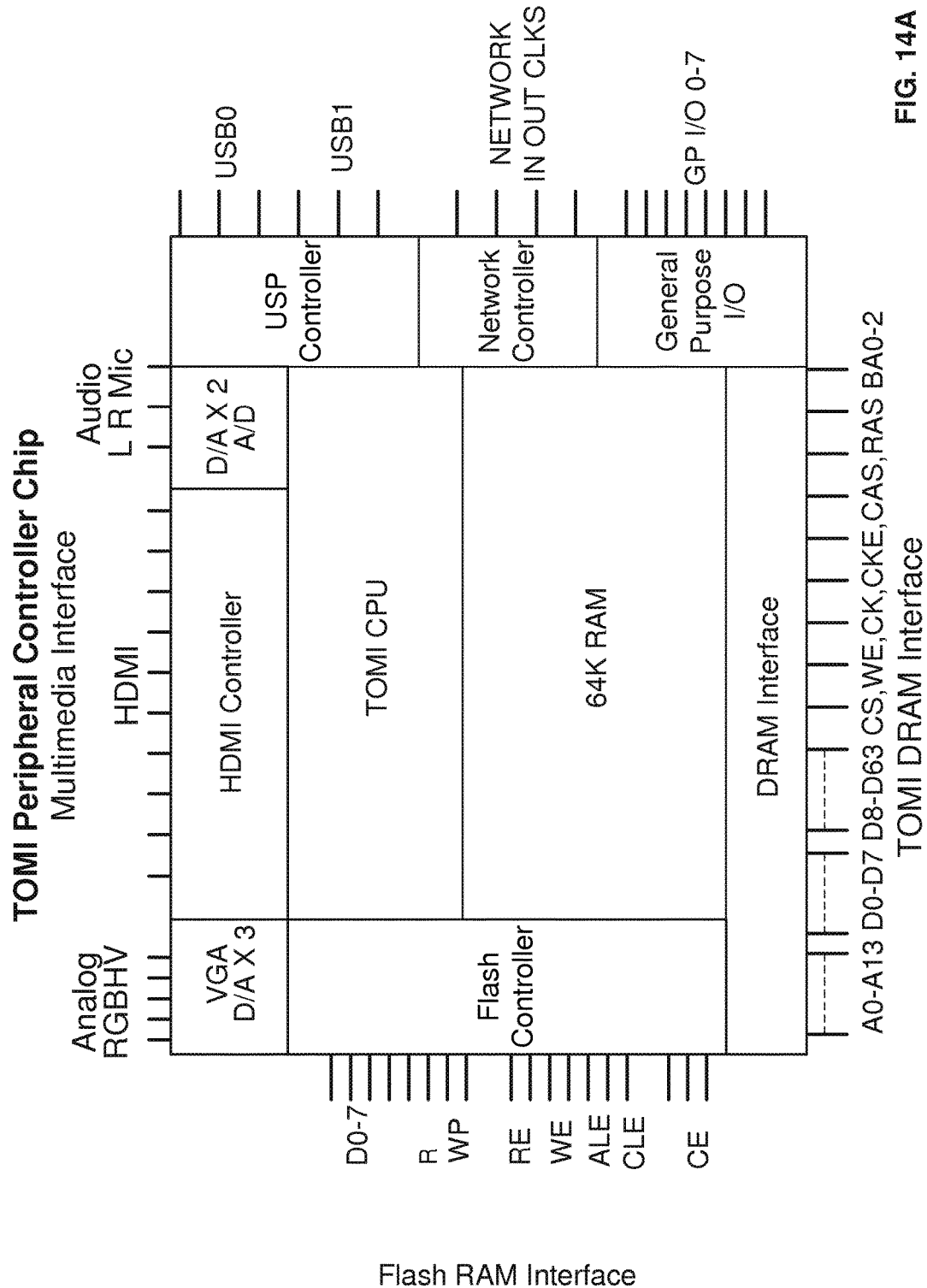
FIG. 14A depicts an exemplary floorplan for a TOMI peripheral controller chip (TOMIPCC).

In some applications the external processor will be provided by a PC. In other applications, a specialized processor may be provided to perform the following functions for the TOMI DRAM chip(s). FIG. 14A shows one embodiment of such a processor, TOMI Peripheral Controller Chip (TOMIPCC). The functions of this processor are:

1. Provide a mechanism to transfer data and instructions from an associated permanent storage device to the TOMI chip DRAM for use. In many systems, the permanent storage device may be a flash RAM.

2. Offer an input/output interface between the TOMI chip(s) and real world devices such as displays and networks.

3. Execute a small set of operating system functions necessary to coordinate TOMI CPU operations.

Figure 14B:
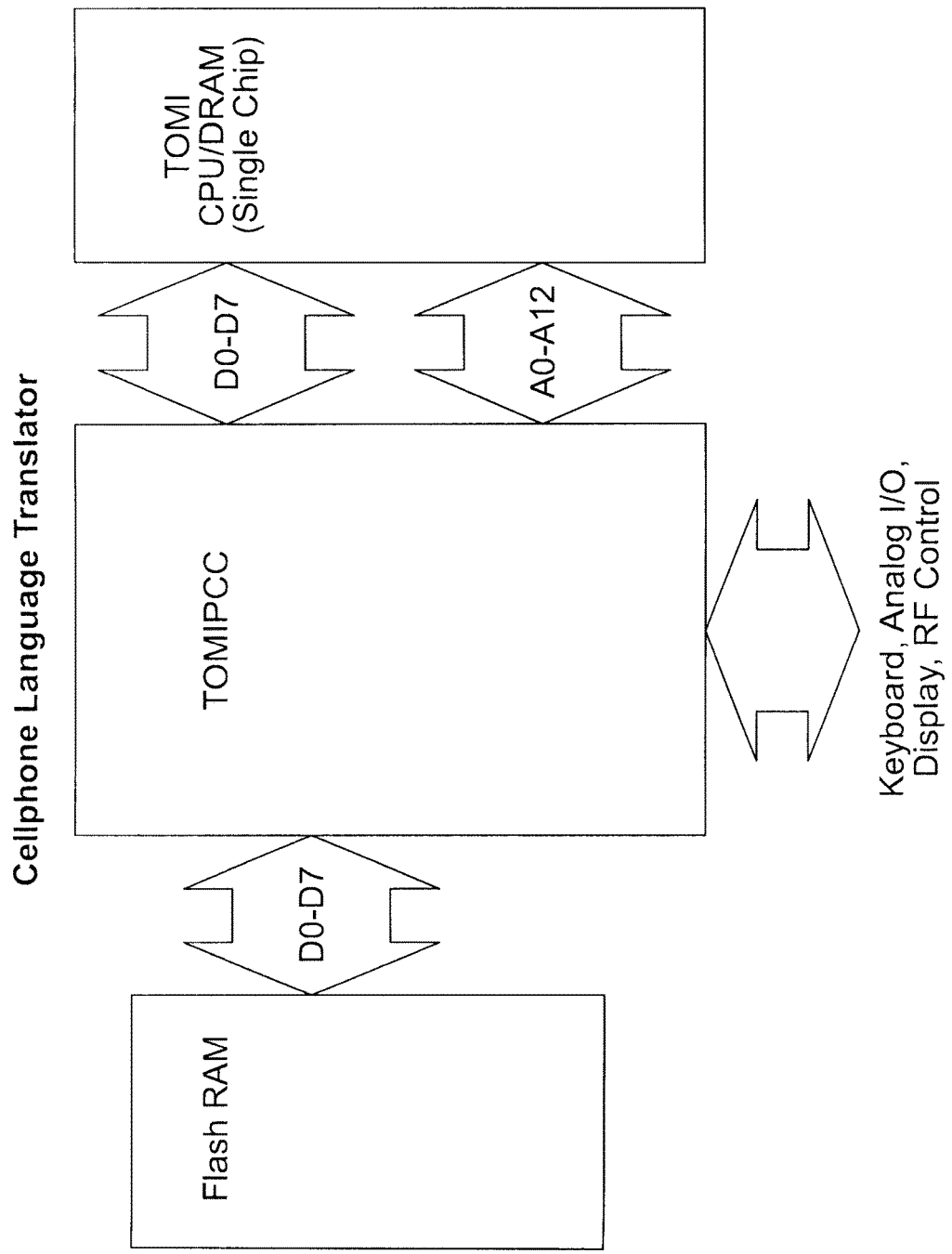
FIG. 14B depicts an exemplary design for a cellphone language translator application using a TOMIPCC.

FIG. 14B shows a very small system using the TOMIPCC. The example of a Cellphone Language Translator consists of only three chips; flash RAM, TOMIPCC, and a single TOMI CPU/DRAM. In this minimal application, the single TOMI CPU/DRAM will communicate through the standard 8-bit DRAM I/O as indicated D0-D7.

The flash RAM will contain the dictionary of phonemes and syntax that define spoken language as well as the instructions necessary to interpret and translate the spoken language from one form to another.

The TOMIPCC will receive the analog spoken language (or its equivalent), convert it to a digital representation, and present it to the TOMI DRAM for interpretation and translation. The resulting digitized speech will be passed back from the TOMI DRAM to the TOMIPCC, converted to an analog voice representation, and then output to the cellphone user.

Figure 14C:
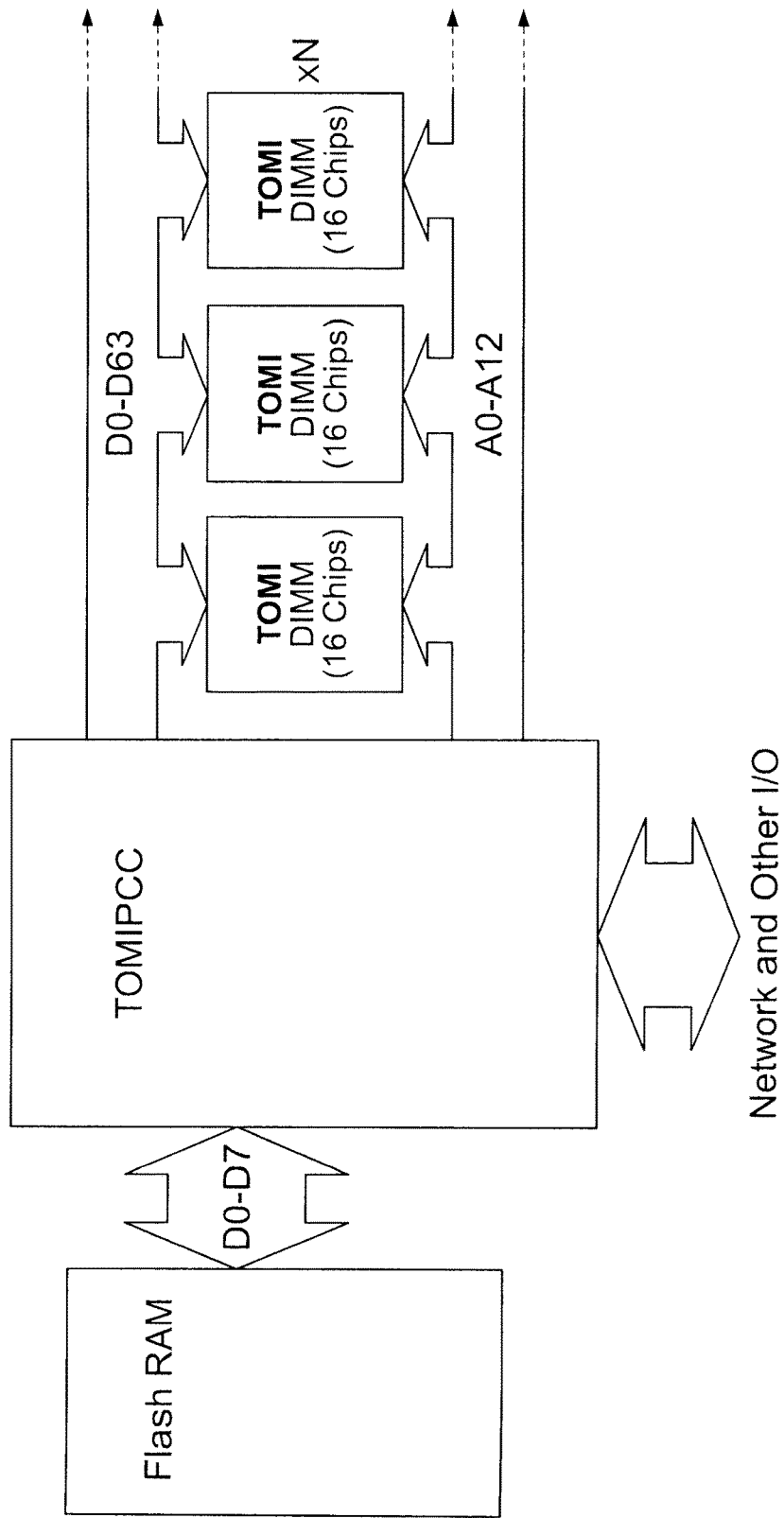
FIG. 14C depicts an exemplary design for a memory-centric database application using a TOMIPCC and a plurality of TOMI DIMMS.
Figure 15A:
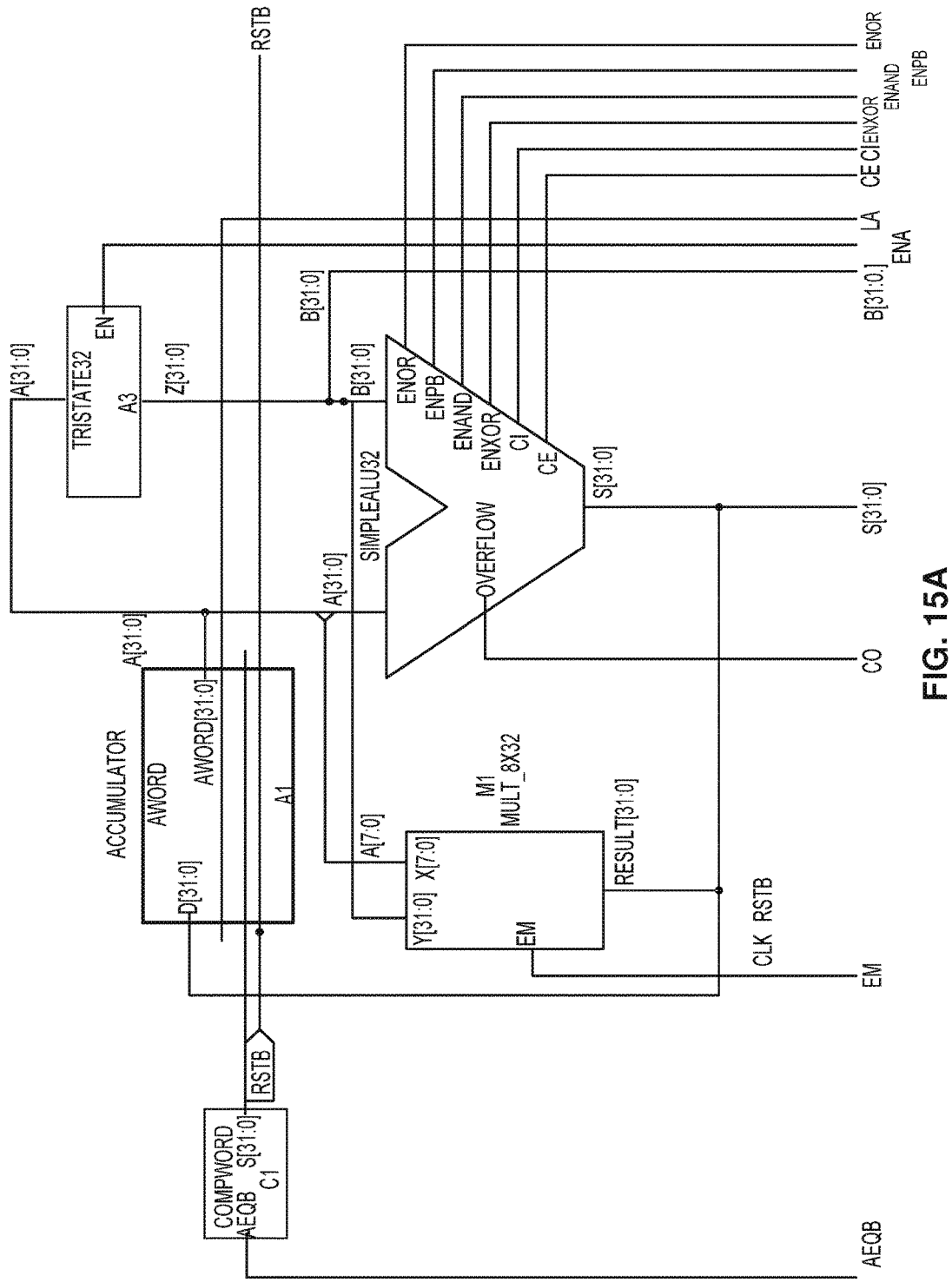
FIGS. 15A through 15D show a top level schematic for an exemplary embodiment of a 32-bit TOMI processor.
Figure 15B:
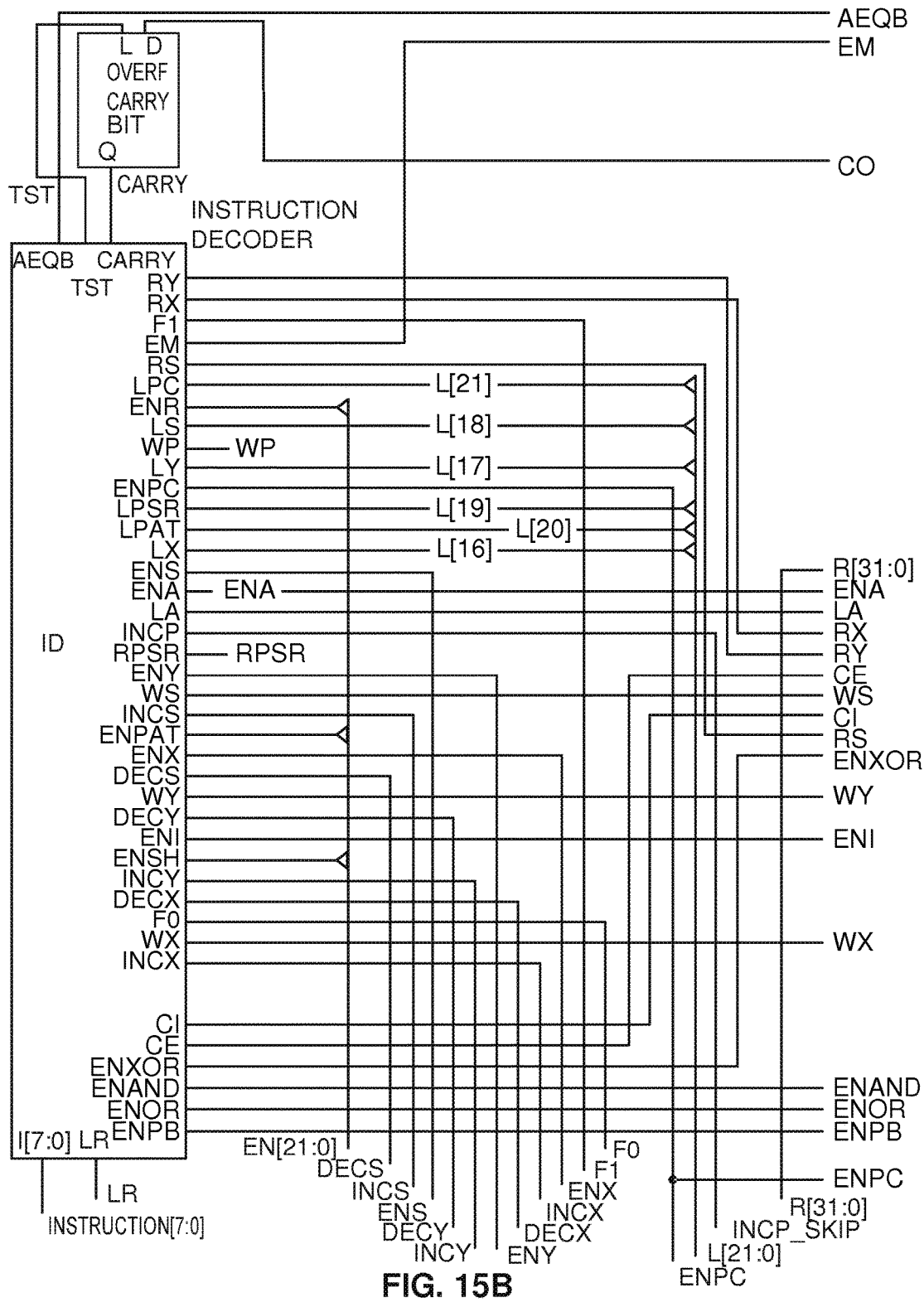
Figure 15C:
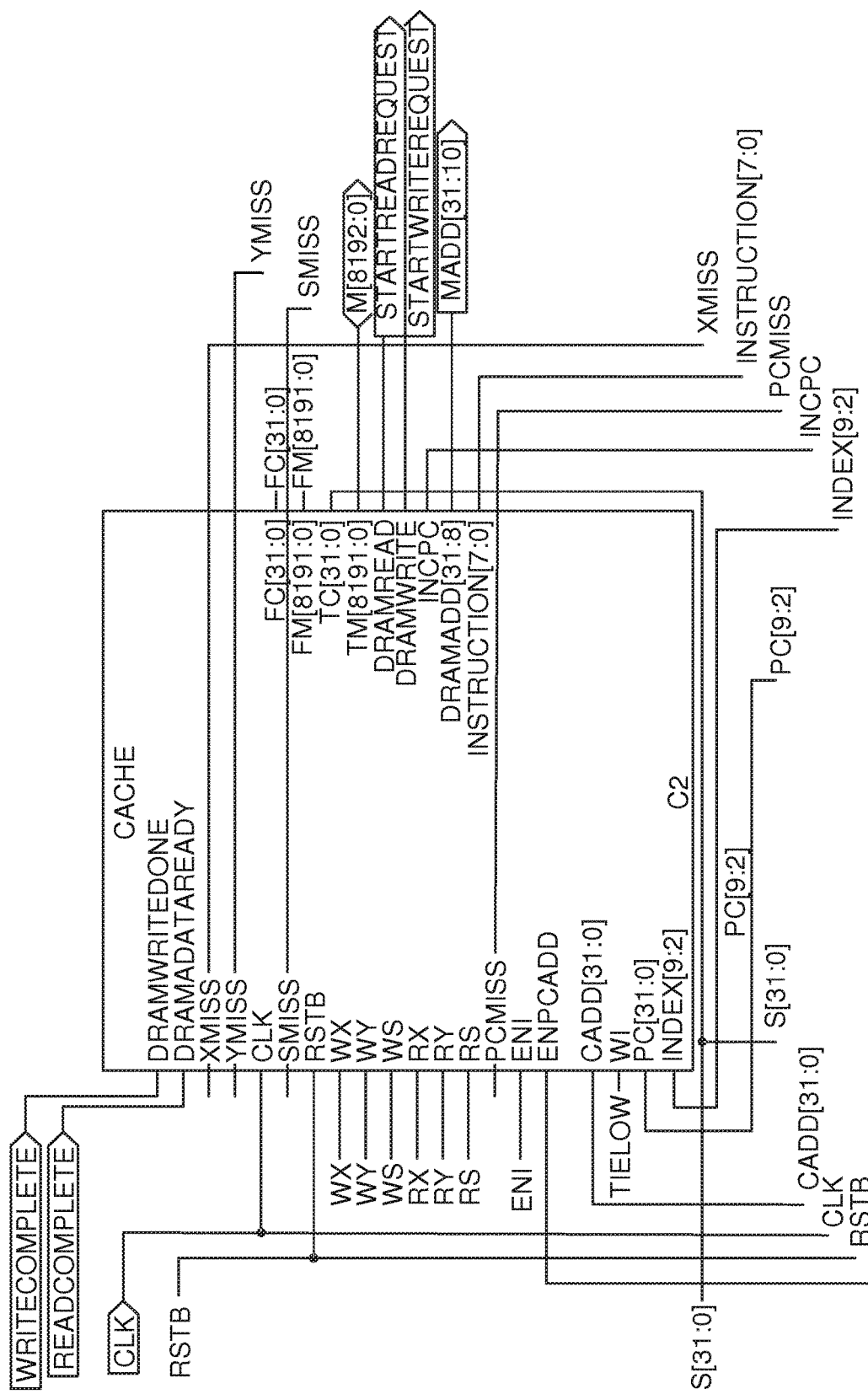
Figure 15D:
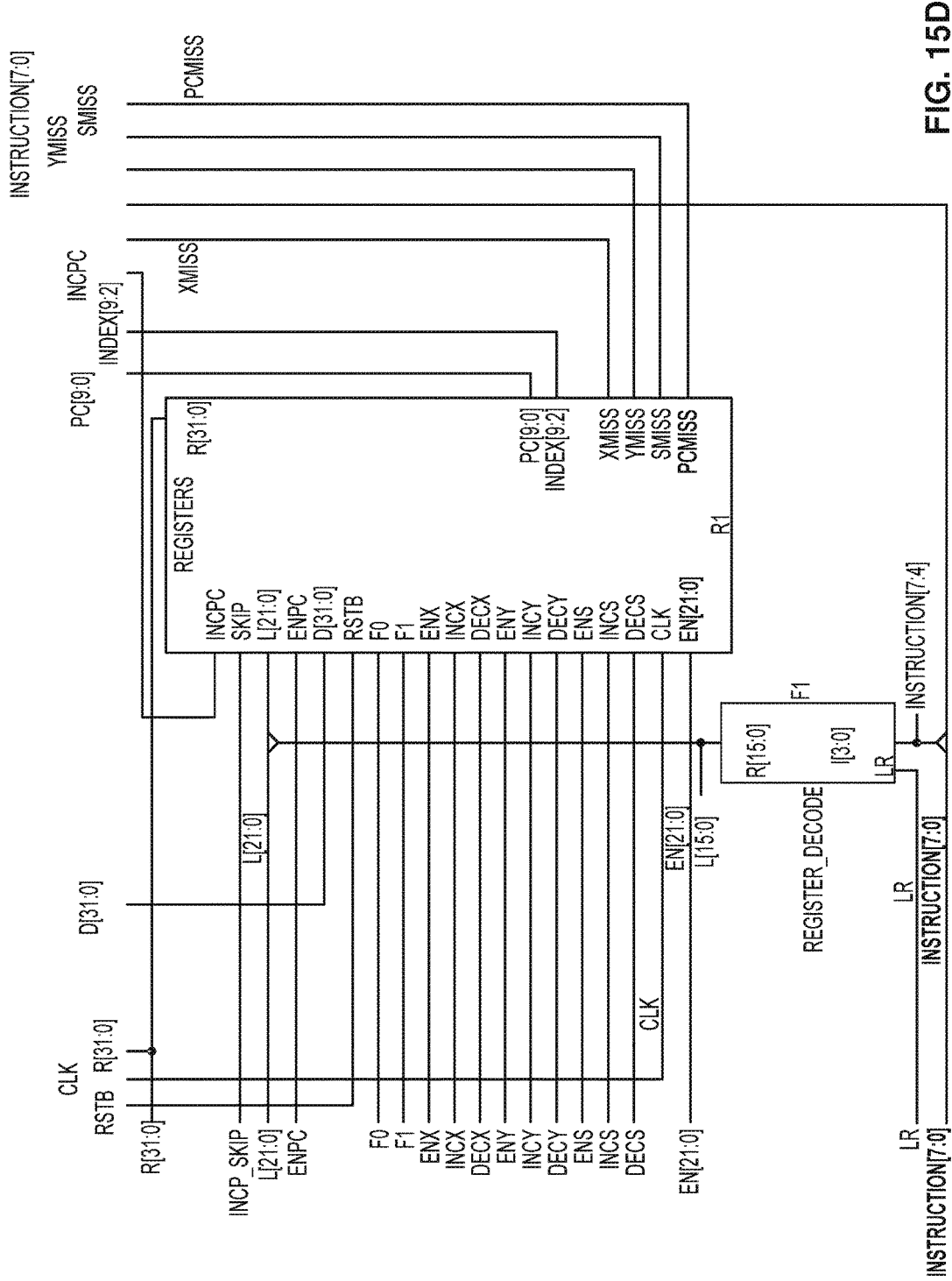

FIG. 14C shows a very large system using the TOMIPCC. An example of such a system is a Memory-centric Database Appliance (or MCDB). An MCDB system operates on an entire database in high speed memory instead of paging pieces of it in from a much slower disk or storage device. Fast searches and sorts are possible with the TOMI architecture by the use of so-called divide and conquer algorithms executing on the TOMI CPUs residing on the same chips as the Memory-centric Database.

Such a system will likely be built with TOMI DIMMs (dual in-line memory modules) incorporating a plurality of TOMI CPU chips. The datapath to a standard 240-pin DIMM is 64 bits. Therefore, the TOMIPCC in a Memory-centric Database application will drive a 64-bit wide database, as indicated by D0-D63.

It will be appreciated that the present invention has been described by way of example only and with reference to the accompanying drawings, and the invention is not limited by the specific embodiments described herein. As will be recognized by those skilled in the art, improvements and modifications may be made to the invention and the illustrative embodiments described herein without departing from the scope or spirit of the invention.

The invention claimed is:

1. A thread optimized multiprocessor prepared by a semiconductor manufacturing process, comprising the steps of:
    (a) interconnecting less than 16 layers of metal on a least one die;
    (b) embedding at least on processor in said at least one die; and
    (c) mounting said at least one die on a dual inline memory module.

2. A thread optimized multiprocessor prepared by a semiconductor manufacturing process, comprising the steps of:
    (a) interconnecting less than 8 layers of metal on a least one die;
    (b) embedding at least on processor in said at least one die; and
    (c) mounting said at least one die on a dual inline memory module.

3. A thread optimized multiprocessor prepared by a semiconductor manufacturing process, comprising the steps of:
    (a) interconnecting less than 4 layers of metal on a least one die;
    (b) embedding at least on processor in said at least one die; and
    (c) mounting said at least one die on a dual inline memory module.

* * * * *